(12) United States Patent
Tsujioka et al.

(10) Patent No.: US 12,737,913 B2
(45) Date of Patent: Sep. 15, 2026

(54) INFORMATION PROCESSING APPARATUS, INFORMATION PROCESSING METHOD, AND RECORDING MEDIUM

(71) Applicant: Panasonic Automotive Systems Co., Ltd., Kanagawa (JP)

(72) Inventors: Shunsuke Tsujioka, Nara (JP); Hirohito Mukai, Tokyo (JP); Yunyun Cao, Tokyo (JP); Shuji Akamatsu, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 268 days.

(21) Appl. No.: 18/598,895

(22) Filed: Mar. 7, 2024

(65) Prior Publication Data

US 2024/0312048 A1 Sep. 19, 2024

(30) Foreign Application Priority Data

Mar. 17, 2023 (JP) ................................ 2023-043157

(51) Int. Cl.

| | |
|---|---|
| ***G06K 9/00*** | (2022.01) |
| ***G01S 13/86*** | (2006.01) |
| ***G01S 17/86*** | (2020.01) |
| ***G06T 7/50*** | (2017.01) |
| ***G06T 7/70*** | (2017.01) |

(52) U.S. Cl.

CPC .............. *G06T 7/70* (2017.01); *G01S 13/867* (2013.01); *G01S 17/86* (2020.01); *G06T 7/50* (2017.01)

(58) Field of Classification Search

CPC ... G06T 7/70; G06T 7/50; G01S 17/86; G01S 13/867

See application file for complete search history.

(56) References Cited

U.S. PATENT DOCUMENTS

| | | | | |
|---|---|---|---|---|
| 8,831,906 B1 * | 9/2014 | Alon | ..................... | G01S 17/933 702/94 |
| 8,896,686 B2 * | 11/2014 | Chen | ..................... | G01C 11/00 348/118 |

(Continued)

FOREIGN PATENT DOCUMENTS

| | | |
|---|---|---|
| JP | 2018-100899 | 6/2018 |
| JP | 6442225 | 12/2018 |
| JP | 2021-160500 | 10/2021 |

OTHER PUBLICATIONS

Notice of Reasons for Refusal for JP App. No. 2023-043157, dated Jan. 28, 2025, with English translation.

*Primary Examiner* — Avinash Yentrapati

(74) *Attorney, Agent, or Firm* — Greenblum & Bernstein, P.L.C.

(57) ABSTRACT

An information processing apparatus according to one aspect of the present disclosure includes: an obtainer that obtains first information indicating a first position of an object, which has been calculated based on a detection result of a range sensor according to a first calculation method, and second information indicating a second position of the object, which has been calculated through simulation according to a second calculation method different from the first calculation method; and a comparator that determines whether the first position is correct by comparing the first information with the second information.

14 Claims, 19 Drawing Sheets

(56) References Cited

U.S. PATENT DOCUMENTS

| | | | | |
|---|---|---|---|---|
| 2013/0301907 | A1* | 11/2013 | Shim | G01B 11/02<br>382/154 |
| 2016/0116590 | A1* | 4/2016 | Fukuman | G01S 15/931<br>367/96 |
| 2018/0172814 | A1* | 6/2018 | Okazaki | G01S 13/04 |
| 2022/0113419 | A1* | 4/2022 | Sharma | G01S 17/86 |
| 2023/0147966 | A1* | 5/2023 | Wang | G01S 17/86<br>382/255 |
| 2023/0230264 | A1* | 7/2023 | Guizilini | G01S 17/86<br>382/106 |
| 2023/0319218 | A1* | 10/2023 | Ren | G06T 3/4038<br>382/284 |
| 2023/0417914 | A1* | 12/2023 | Chretien | G01S 17/931 |

* cited by examiner

FIG. 2

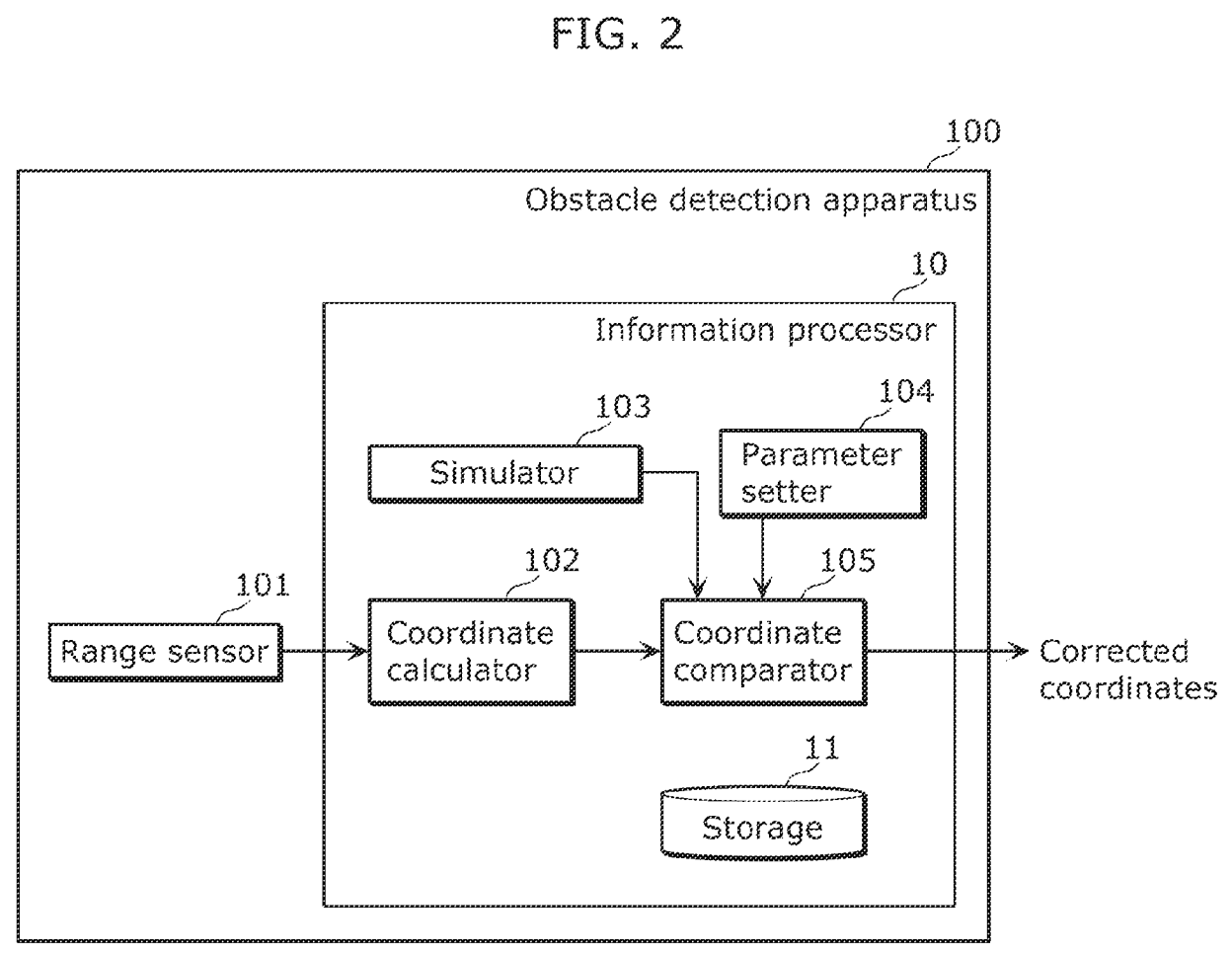

100 Obstacle detection apparatus

10 Information processor

101 Range sensor

102 Coordinate calculator

103 Simulator

104 Parameter setter

105 Coordinate comparator

11 Storage

Corrected coordinates

Figure 4:
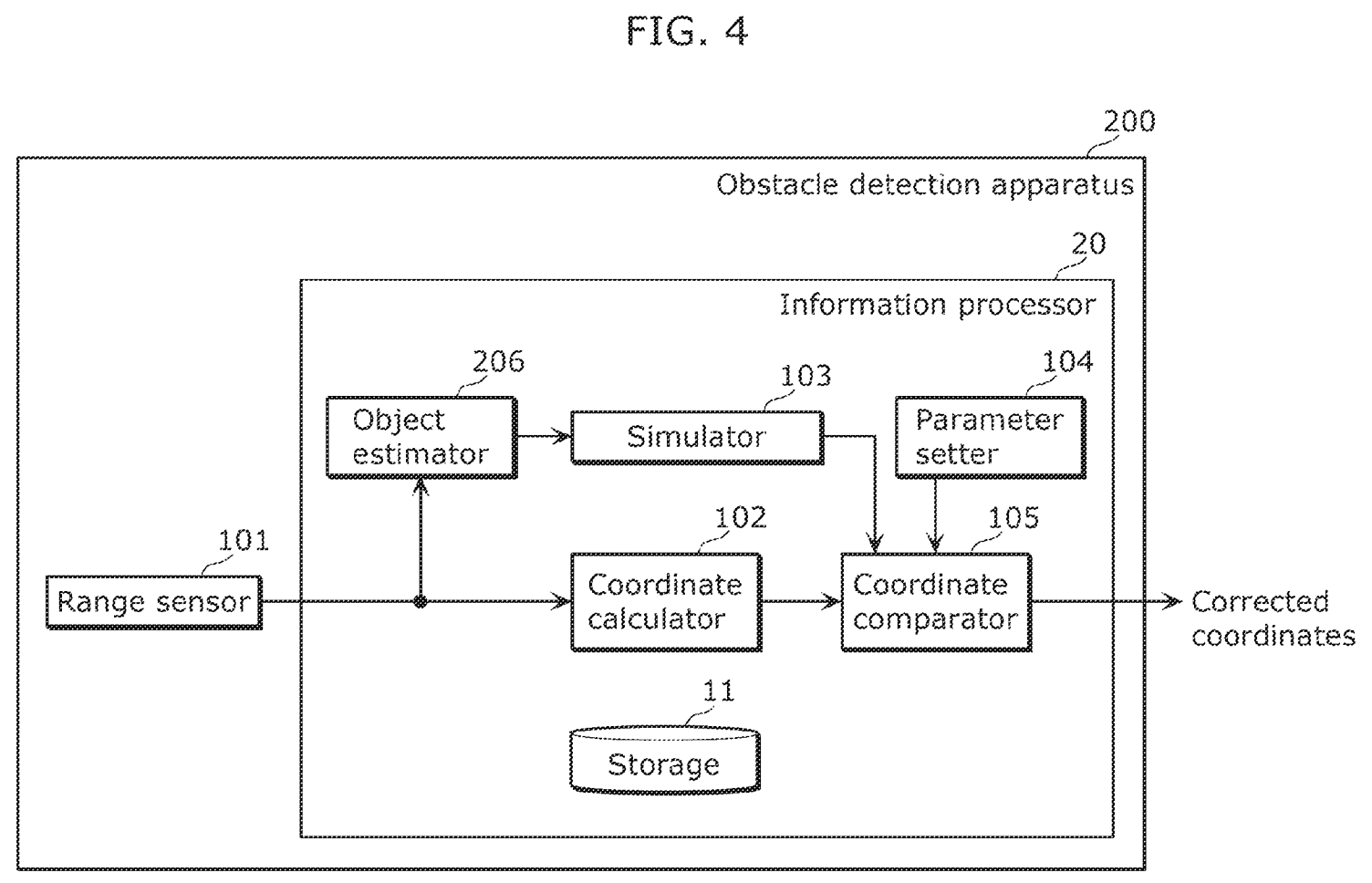

200 Obstacle detection apparatus

20 Information processor

101 Range sensor

206 Object estimator

103 Simulator

104 Parameter setter

102 Coordinate calculator

105 Coordinate comparator

11 Storage

Corrected coordinates

FIG. 5

520
640
700
(a)
Received-wave power
High
Time
(b)
530
640
700
(c)
Received-wave power
Low
Time
(d)

FIG. 8

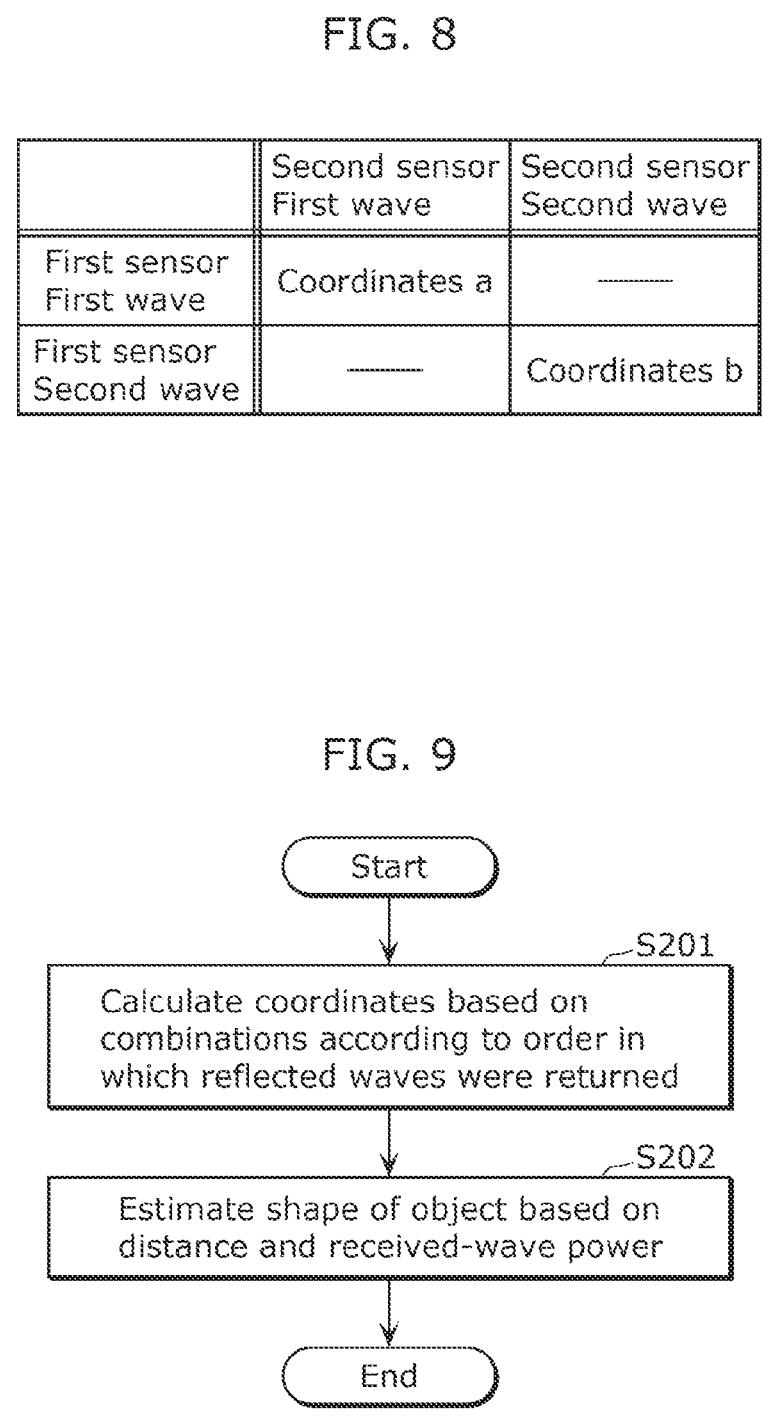

| | Second sensor First wave | Second sensor Second wave |
|---|---|---|
| First sensor First wave | Coordinates a | ——— |
| First sensor Second wave | ——— | Coordinates b |

FIG. 9

Start

S201: Calculate coordinates based on combinations according to order in which reflected waves were returned S202: Estimate shape of object based on distance and received-wave power End 500
510
R1
R2
C1
C2
600
610
620
630
700
Longitudinal axis of vehicle

FIG. 11

| | Second sensor First wave | Second sensor Second wave |
|---|---|---|
| First sensor First wave | Coordinates a | Coordinates d |
| First sensor Second wave | Coordinates c | Coordinates b |

FIG. 18

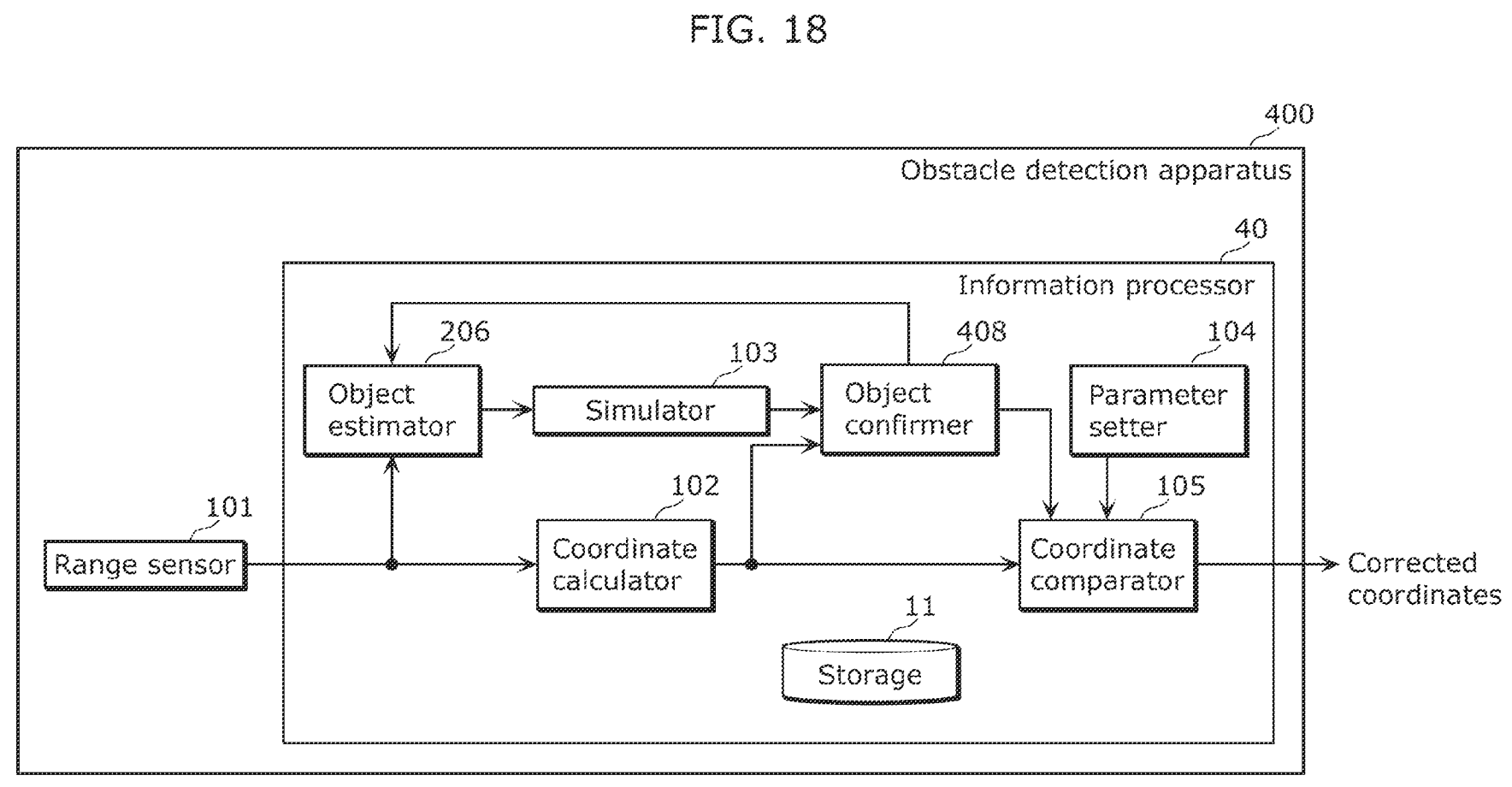

400
Obstacle detection apparatus
40
Information processor
101
Range sensor
206
Object estimator
103
Simulator
408
Object confirmer
104
Parameter setter
102
Coordinate calculator
105
Coordinate comparator
11
Storage
Corrected coordinates

INFORMATION PROCESSING APPARATUS, INFORMATION PROCESSING METHOD, AND RECORDING MEDIUM

CROSS REFERENCE TO RELATED APPLICATION

The present application is based on and claims priority of Japanese Patent Application No. 2023-043157 filed on Mar. 17, 2023.

FIELD

The present disclosure relates to an information processing apparatus, an information processing method, and a recording medium for detecting a position of an object.

BACKGROUND

To improve safety of vehicles and drivers and to prevent accidents, advanced driving assistant systems (ADAS), each of which obtains information on the surroundings of a vehicle to support the driving of a driver, are being developed and implemented at an accelerated pace.

For example, ranging by a range sensor, such as an ultrasonic sensor, a radar, or a lidar, may be performed to obtain the information on the surroundings of the vehicle. According to such a range sensor, a distance between the vehicle and an object around the vehicle can be calculated by obtaining reflected waves from the object. In addition, a position and shape of the object can be identified by performing image processing on image information on scenery or the object around the vehicle, which is obtained by a camera, for example. Installing such a range sensor in the vehicle allows for multidirectional monitoring. For example, detection results of the range sensor disposed at the front of the vehicle can be used to prevent a rear-end collision. For example, detection results of the range sensor disposed at the rear of the vehicle can be used to prevent the vehicle from having accidental contact with a wall or another vehicle when parking.

Patent Literature (PTL) 1 discloses an object detection apparatus that transmits a probe wave, receives reflected waves of the transmitted probe wave as object detection information, and detects an object around a moving object based on the detection information.

CITATION LIST

Patent Literature

PTL 1: Japanese Patent No. 6442225

SUMMARY

However, the object detection apparatus according to PTL 1 can be improved upon.

In view of this, the present disclosure provides, for example, an information processing apparatus capable of improving upon the above related art.

An information processing apparatus according to an aspect of the present disclosure includes: an obtaining circuit that obtains first information indicating a first position of an object and second information indicating a second position of the object, the first position having been calculated based on a detection result of a range sensor according to a first calculation method, the second position having been calculated through simulation according to a second calculation method different from the first calculation method; and a comparison circuit that determines whether the first position is correct by comparing the first information with the second information.

An information processing method according to an aspect of the present disclosure is an information processing method to be executed by a computer. The information processing method includes: obtaining first information indicating a first position of an object and second information indicating a second position of the object, the first position having been calculated based on a detection result of a range sensor according to a first calculation method, the second position having been calculated through simulation according to a second calculation method different from the first calculation method; and determining whether the first position is correct by comparing the first information with the second information.

A recording medium according to an aspect of the present disclosure is a non-transitory computer-readable recording medium having recorded thereon a program for executing the information processing method described above.

The present disclosure provides, for example, an information processing apparatus capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 2 is a block diagram illustrating a configuration of an obstacle detection apparatus according to Embodiment 1.

FIG. 3 is a flowchart showing a processing procedure of the obstacle detection apparatus according to Embodiment 1.

FIG. 4 is a block diagram illustrating a configuration of an obstacle detection apparatus according to Embodiment 2.

FIG. 5 is a diagram for explaining a process to be performed by an object estimator according to Embodiment 2 to determine a shape of an object.

FIG. 8 is a diagram for explaining a relationship between detection results of a range sensor and positions of the objects.

FIG. 9 is a flowchart showing a processing procedure of the object estimator according to Embodiment 2.

FIG. 11 is a diagram for explaining a relationship between detection results of the range sensor and positions of the objects.

FIG. 18 is a block diagram illustrating a configuration of an obstacle detection apparatus according to Embodiment 7.

DESCRIPTION OF EMBODIMENTS

Figure 1:
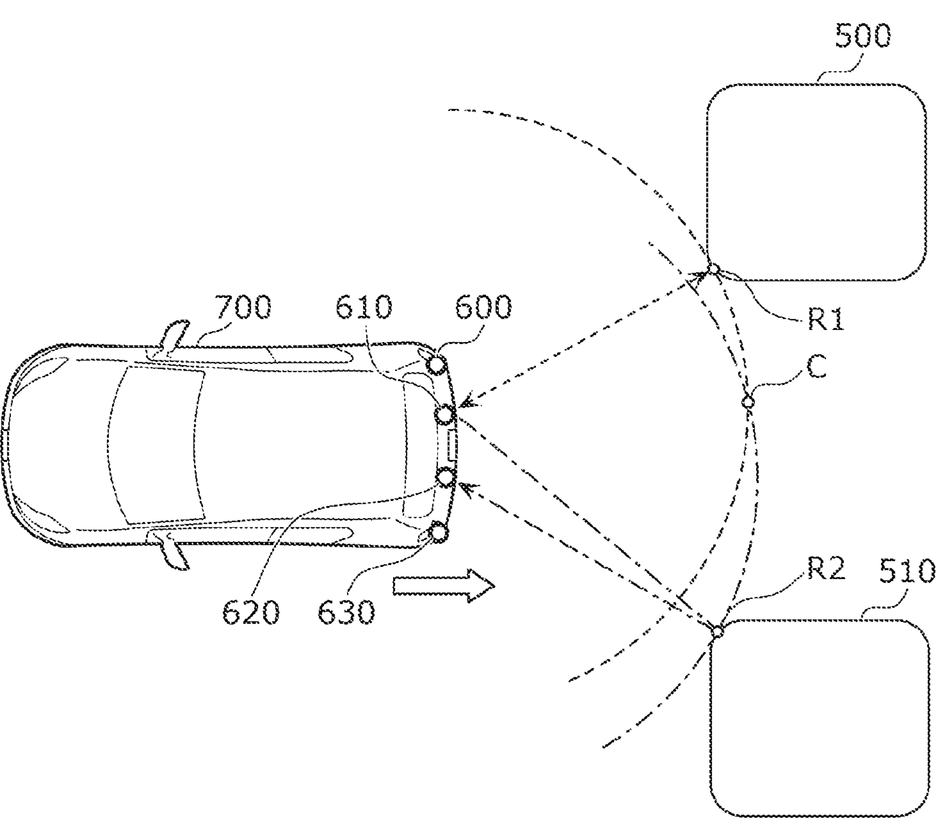
FIG. 1 is a diagram for explaining a specific example of detecting positions of objects.

Hereinafter, certain exemplary embodiments of the present disclosure will be described with reference to the accompanying Drawings. Each of the exemplary embodiments to be described below shows a specific example of the present disclosure. The numerical values, shapes, materials, elements, the arrangement and connection of the elements, etc. shown in the following exemplary embodiments are mere examples, and therefore do not limit the scope of the present disclosure. Therefore, among the elements in the following exemplary embodiments, those not recited in any one of the independent claims are described as optional elements.

Each of the figures is a schematic diagram and is not necessarily drawn in a precise manner. In the figures, substantially the same elements are denoted by the same reference numerals, and redundant explanations are omitted or simplified.

Embodiment 1

(Configuration)

FIG. 1 is a diagram for explaining a specific example of detecting positions of objects. FIG. 2 is a block diagram illustrating a configuration of obstacle detection apparatus 100 according to Embodiment 1.

Obstacle detection apparatus 100 is an apparatus for detecting a position of an object. Obstacle detection apparatus 100 is an example of an information processing apparatus. Obstacle detection apparatus 100 is mounted on vehicle 700, for example, to detect objects 500 and 510 located around vehicle 700 based on detection results of range sensor 101 (e.g., wave receiving sensors 600, 610, 620, and 630).

Objects 500 and 510 are objects such as obstacles located around vehicle 700, including walls, poles, pedestrians, or other vehicles, which may interfere with traveling of vehicle 700.

Obstacle detection apparatus 100 includes range sensor 101 and information processor 10.

Range sensor 101 is a sensor that detects information to calculate a position of an object (specifically, a distance and direction to the object). Range sensor 101 emits a radio wave or a sound wave, for example, and detects a reflected wave which is the radio wave or the sound wave reflected from the object. Range sensor 101 is, for example, an ultrasonic sensor, a radar, or a lidar. In the present embodiment, range sensor 101 is an ultrasonic sensor that emits an ultrasonic wave and receives its reflected wave from the object to output, to information processor 10 as a detection result, information to calculate the distance to the object based on an amount of time from the emission of the ultrasonic wave to the reception of the reflected wave.

Range sensor 101 includes wave receiving sensors 600, 610, 620, and 630 arranged on vehicle 700, for example. Wave receiving sensors 600, 610, 620, and 630 are located at different positions on vehicle 700.

Each of wave receiving sensors 600, 610, 620, and 630 is a sensor that detects reflected waves. In the present embodiment, only wave receiving sensor 610 is an active sensor with a function of outputting a radio wave or a sound wave (in the present embodiment, an ultrasonic wave), while wave receiving sensors 600, 620, and 630 are passive sensors without the function of outputting an ultrasonic wave. Each of wave receiving sensors 600, 610, 620, and 630 detects a reflected wave which is an ultrasonic wave emitted by wave receiving sensor 610 and reflected from the object, and outputs its detection result to information processor 10.

For example, any number of active sensors may be present in range sensor 101 included in obstacle detection apparatus 100 as long as at least one active sensor is provided.

The type of range sensor 101 is not limited to the ultrasonic sensor. Any sensor capable of calculating the distance and direction to the object may be used.

Information processor 10 is a processing device that performs various processing to be executed by obstacle detection apparatus 100. Information processor 10 is implemented, for example, by a nonvolatile memory in which programs are stored, a volatile memory, which is a temporary storage area for executing the programs, and a processor that executes the programs. Information processor 10 may include a communication interface to communicate with, for example, an electronic control unit (ECU) and a server included in vehicle 700.

Information processor 10 includes coordinate calculator 102, simulator 103, parameter setter 104, and coordinate comparator 105.

Coordinate calculator 102 is a processing element that generates position information by calculating a position (first position) of the object according to a first calculation method based on the detection result of range sensor 101.

The position information is information indicating the first position of the object calculated according to the first calculation method based on the detection result of range sensor 101. The position information is an example of first information. The position (coordinates) of the object calculated by coordinate calculator 102 is referred to also as the first position.

For example, coordinate calculator 102 obtains, as input information, received-wave information such as transmission time, reception time, and received-wave power, which can be obtained from range sensor 101 as the detection result of range sensor 101. Coordinate calculator 102 then calculates the position of the object by performing triangulation using distances that can be calculated from a reflected wave to a wave transmitting sensor (in the present embodiment, wave receiving sensor 610) that emits a wave such as a radio wave or a sound wave and a reflected wave to a sensor different from the wave transmitting sensor. Coordinate calculator 102 outputs the calculation result to coordinate comparator 105. Such triangulation is an example of the first calculation method.

Simulator 103 is a processing element that generates false detection information by calculating a position (second position) of the object through simulation according to a second calculation method different from the first calculation method. Specifically, simulator 103 generates second information by calculating the second position through simulation according to the second calculation method using object information indicating a third position and shape of the object as well as vehicle information regarding vehicle 700 in/to which range sensor 101 is provided. The third position is an arbitrarily-set object position, for example. The third position may be a position (coordinates) of the object calculated by object estimator 206 (see FIG. 4) to be described later.

The false detection information is information indicating the second position of the object calculated through simulation according to the second calculation method different from the first calculation method. The false detection information is an example of the second information. The position (coordinates) of the object calculated by simulator 103 is referred to also as the second position.

The object information is information indicating the third position and shape of the object.

The vehicle information is information regarding vehicle 700 in/to which range sensor 101 is provided. The vehicle information includes information indicating a position of vehicle 700, information indicating a speed of vehicle 700, and information indicating a traveling direction of vehicle 700, for example. The vehicle information is obtained, for example, from the ECU and a global positioning system (GPS) included in vehicle 700.

For example, simulator 103 takes, as input information, information indicating the position of the object, the shape of the object, the speed of vehicle 700, and the position of vehicle 700, for example, and calculates the position of the object by calculating a reflection point, on the object, of the wave outputted from range sensor 101 to the object using a mathematical model. Simulator 103 outputs the calculation result to coordinate comparator 105.

As described above, coordinate calculator 102 calculates the position of the object by performing triangulation using the detection result of range sensor 101, for example. Simulator 103 performs the simulation to calculate the reflection point using the mathematical model and obtains the reflection point, which is the result of the simulation, as the position of the object, for example. Such a calculation using the mathematical model is an example of the second calculation method. For example, the second calculation method uses the shape of the object to calculate the reflection point, while the first calculation method does not use the shape of the object.

Parameter setter 104 is a processing element that sets a parameter to be used by coordinate comparator 105. For example, the parameter is information indicating a predetermined distance. The parameter is stored in advance in storage 11, for example. A plurality of parameters indicating distances different from one another, for example, are stored in storage 11. Parameter setter 104 sets a parameter based on an instruction given, for example, by a driver, which is obtained via a user interface such as a touch panel display (not shown), for example. Parameter setter 104 outputs the set parameter to coordinate comparator 105.

Coordinate comparator 105 is a processing element that obtains the position information and the false detection information and determines whether the position information is correct by comparing the position information with the false detection information. Specifically, coordinate comparator 105 determines whether the first information indicated by the position information is correct by comparing the first position indicated by the position information with the second position indicated by the false detection information. Coordinate comparator 105 is an example of an obtainer and a comparator. For example, coordinate comparator 105 takes output information from coordinate calculator 102, simulator 103, and parameter setter 104 as an input, determines whether the detected coordinates (the position of the object) provided by coordinate calculator 102 and those provided by simulator 103 are the same based on the information (parameter) from parameter setter 104, and filters out the calculation result indicating the incorrect position of the object (falsely detected coordinates), which has been obtained by coordinate calculator 102.

For example, coordinate comparator 105 determines whether the first position is correct by determining whether the first position indicated by the position information and the second position indicated by the false detection information are located within the predetermined distance indicated by the parameter set by parameter setter 104. For example, when the first position and the second position are located within the predetermined distance, coordinate comparator 105 determines that the first position is correct, i.e., the object is located at the first position. When the first position and the second position are not located within the predetermined distance, on the other hand, coordinate comparator 105 determines that the first position is incorrect, i.e., the object is not located at the first position.

The calculation method to be performed by coordinate calculator 102 has a high calculation speed. Due to the principle of the calculation, however, when objects 500 and 510 exist as shown in FIG. 1, for example, not only reflection positions R1 and R2 are calculated as positions of objects 500 and 510, respectively, but also intersection C may be calculated as a position of an object based on a detection result of an ultrasonic wave emitted by wave receiving sensor 610, reflected from object 500, and detected by wave receiving sensor 610, which is indicated by dashed arrows, and a detection result of an ultrasonic wave emitted by wave receiving sensor 610, reflected from object 510, and detected by wave receiving sensor 620, which is indicated by a dash-dotted arrow. In view of this, obstacle detection apparatus 100 calculates the positions of the objects also by simulator 103 according to the method using the mathematical model, which prevents the calculation of such an incorrect object position that occurs due to the principle of the calculation. When a position of a new object is calculated by coordinate calculator 102, for example, simulator 103 simulates whether the object actually exists as described above.

These processing elements, i.e., coordinate calculator 102, simulator 103, parameter setter 104, and coordinate comparator 105, are each implemented, for example, by a processor and a memory having stored therein a control program to be executed by the processor.

Storage 11 is a storage device in which information to be used by the processing elements, such as the parameters and the object information, is stored. Storage 11 is implemented, for example, by a hard disk drive (HDD) or a semiconductor memory.

(Operations)

A processing procedure of obstacle detection apparatus 100 will be described next.

Figure 3:
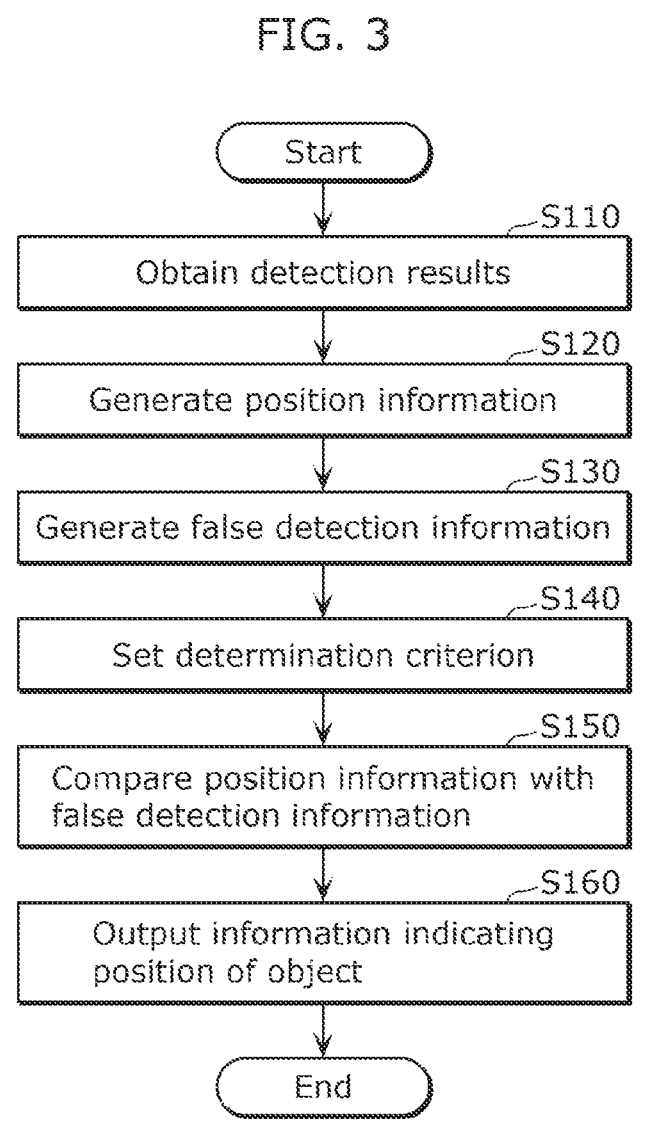

FIG. 3 is a flowchart showing the processing procedure of obstacle detection apparatus 100 according to Embodiment 1.

First, coordinate calculator 102 obtains a detection result from range sensor 101 (S110).

Next, coordinate calculator 102 generates position information indicating a first position of an object by performing triangulation based on the obtained detection result (S120). Specifically, coordinate calculator 102 calculates coordinates of the object by means of triangulation based on the detection result, which is information such as transmission time, reception time, and received-wave power obtained from range sensor 101 mounted on vehicle 700.

Simulator 103 generates false detection information indicating a second position of the object using a mathematical model based on object information and vehicle information (S130). Specifically, simulator 103 constructs the mathematical model based on the object information and the vehicle information, and calculates coordinates of the object, which are derived from the mathematical model. In the present embodiment, the object information is stored in advance in storage 11, for example, as known information.

As to steps S120 and S130, step S120 may be performed first, step S130 may be performed first, or these steps may be performed simultaneously.

Next, parameter setter 104 sets a determination criterion for coordinate comparator 105 (S140). For example, parameter setter 104 sets information indicating a predetermined distance as the determination criterion.

Next, coordinate comparator 105 compares the position information with the false detection information (S150). Specifically, coordinate comparator 105 determines whether the first position and the second position are the same position according to the criterion of the parameter obtained from parameter setter 104.

Next, coordinate comparator 105 outputs information indicating the position of the object to the ECU in vehicle 700, for example, based on the comparison result (S160). For example, when the first and second positions are determined in step S150 to be the same position, coordinate comparator 105 outputs the position information to the ECU in vehicle 700, for example. When the first and second positions are determined in step S150 not to be the same position, on the other hand, coordinate comparator 105 generates and outputs corrected information, which is obtained by correcting the first position indicated by the position information. For example, when the position information indicates reflection position R1, reflection position R2, and intersection C shown in FIG. 1 as the first positions, and the false detection information indicates reflection position R1 and reflection position R2 as the second positions, coordinate comparator 105 filters out (deletes) the position (coordinates) of intersection C as false detection, and the result after such filtering is outputted as the corrected information.

(Effects, etc.)

As described above, according to obstacle detection apparatus 100 of the present embodiment, whether the position of the object calculated based on the detection result from range sensor 101 is a falsely-detected position can be determined by comparing the position of the object calculated based on the detection result from range sensor 101 with the position of the object calculated using the mathematical model. Thus, obstacle detection apparatus 100 can also filter out false detection that occurs at a certain position due to the calculation, which cannot be solved by PTL 1 mentioned above, for example. Obstacle detection apparatus 100 is therefore useful even for invariable false detection such as false detection that occurs due to the principle of range sensor 101. If vehicle 700 controls its brakes based on the detection result, for example, erroneous control of the brakes due to such false detection, for example, can be prevented from occurring.

Embodiment 2

Embodiment 2 will be described next. Note that the description of the present embodiment will focus on differences from the above-described embodiment.

(Configuration)

FIG. 4 is a block diagram illustrating a configuration of obstacle detection apparatus 200 according to Embodiment 2.

Obstacle detection apparatus 200 further includes object estimator 206 in addition to the configuration of obstacle detection apparatus 100 according to Embodiment 1.

Object estimator 206 is a processing element that generates object information by estimating a third position based on received-wave information indicating strength of a reflected wave detected by range sensor 101, which is included in a detection result of range sensor 101. Specifically, as with coordinate calculator 102, object estimator 206 obtains the detection result such as transmission time, reception time, and received-wave power from range sensor 101 as input information, and calculates the position (third position) of an object and a shape of the object based on the detection result. The position (coordinates) of the object calculated by object estimator 206 is referred to also as the third position. Object estimator 206 outputs the calculation result to simulator 103 as the object information.

Object estimator 206 is implemented, for example, by a processor and a memory having stored therein a control program to be executed by the processor.

Figure 5:
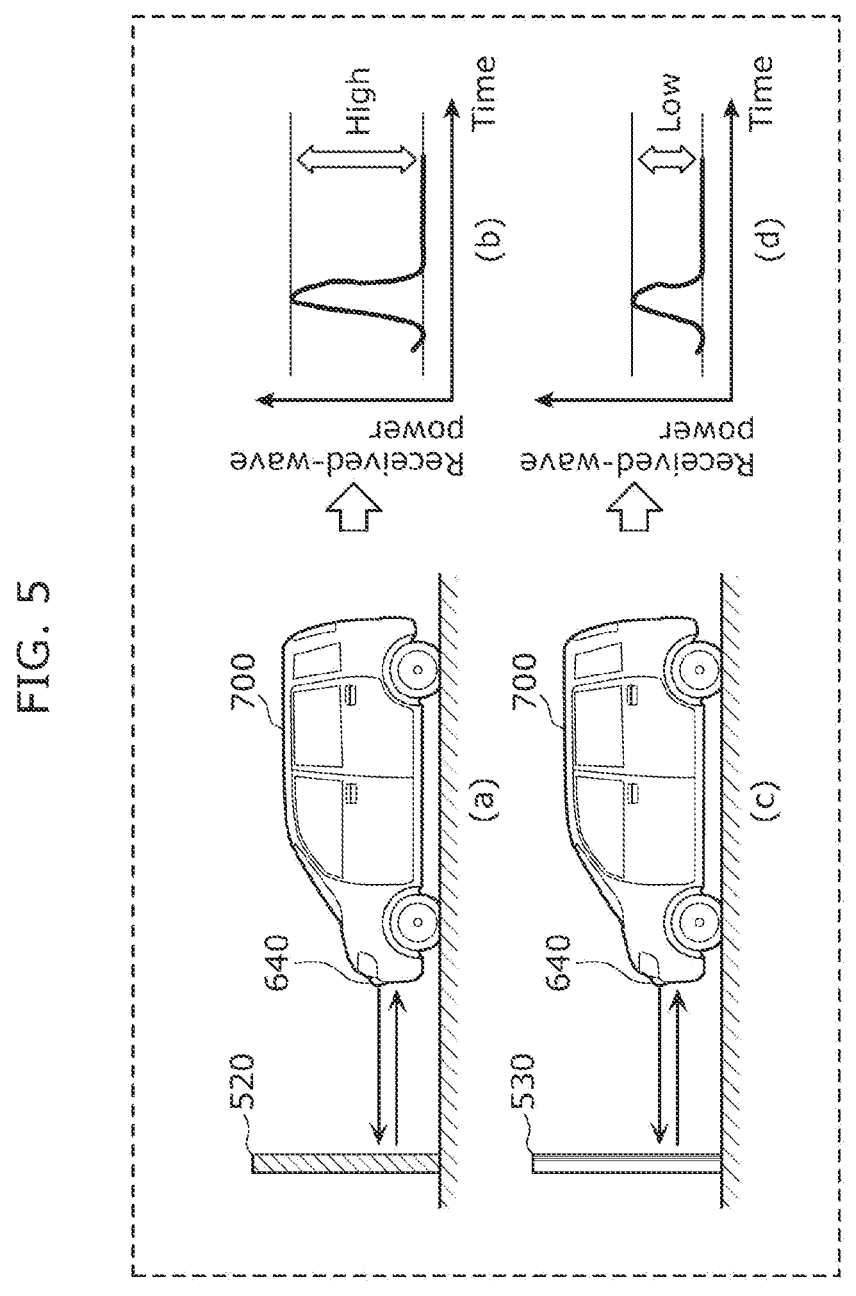
Figure 6:
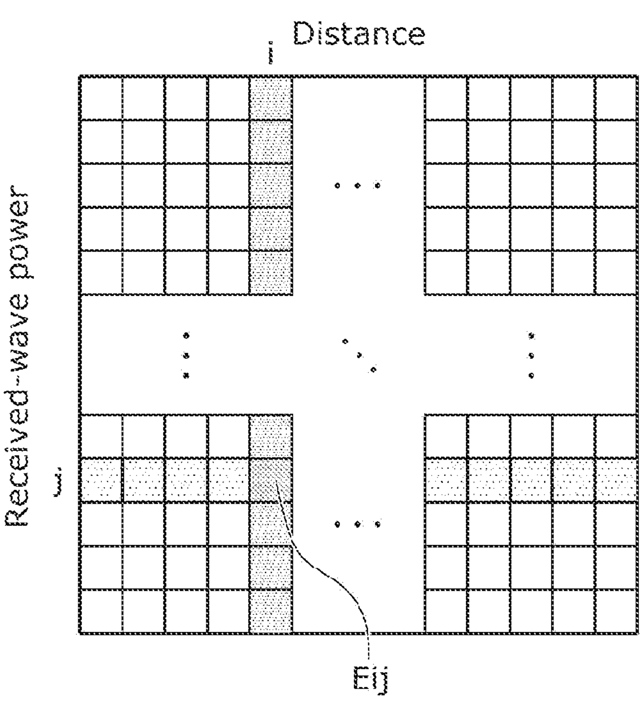
FIG. 6 is a diagram for explaining the process to be performed by the object estimator according to Embodiment 2 to determine the shape of the object.

FIGS. 5 and 6 are diagrams for explaining a process to be performed by object estimator 206 according to Embodiment 2 to determine a shape of an object.

As shown in (a) and (c) of FIG. 5, assume that wave receiving sensor 640 is provided in/to vehicle 700, for example. Wave receiving sensor 640 is, for example, an active sensor included in range sensor 101, which emits an ultrasonic wave and detects its reflected wave. In (a) and (c) of FIG. 5, objects have shapes different from each other. In (b) of FIG. 5, a graph is shown indicating a detection result for a reflected wave from object 520 such as a wall shown in (a) of FIG. 5. In (d) of FIG. 5, a graph is shown indicating a detection result for a reflected wave from object 530 such as a pole shown in (c) of FIG. 5. In each of these graphs, a horizontal axis represents time, and a vertical axis represents intensity of the reflected wave (received-wave power).

As shown in (a) of FIG. 5, if object 520 is an object such as a wall that returns a strong reflected wave (i.e., a highly-reflective object), for example, wave receiving sensor 640 detects the reflected wave having high received-wave power as shown in (b) of FIG. 5.

As shown in (c) of FIG. 5, if object 530 is an object such as a pole that is long and narrow and returns a relatively weak reflected wave as compared to a wall (i.e., a less-reflective object), for example, wave receiving sensor 640 detects the reflected wave having low received-wave power as shown in (d) of FIG. 5.

For the same object, wave receiving sensor 640 detects a reflected wave having higher received-wave power as a distance between wave receiving sensor 640 and the object decreases.

In view of the above, a type of the object (e.g., a shape such as a pole or a wall) can be determined based on the position of the object (specifically, the distance between wave receiving sensor 640 and the object) and the received-wave power.

FIG. 6 is a table showing a relationship among received-wave power, a distance, and an object shape, for example. When the distance between wave receiving sensor 640 and the object is i and the received-wave power is j, for example, these correspond to cell Eij (row i, column j shown in FIG. 6) in the table of FIG. 6. Cell Eij provides predetermined information such as the object being in the shape of a pole (i.e., the type of the object is a pole), for example. The information (correspondence information) in such a table is stored in advance in storage 11, for example.

For example, object estimator 206 estimates the position (third position) of the object by performing triangulation based on the detection result of range sensor 101, and estimates the shape of the object based on the calculated position and the correspondence information. Object estimator 206 outputs the estimation result to simulator 103.

Figure 7:
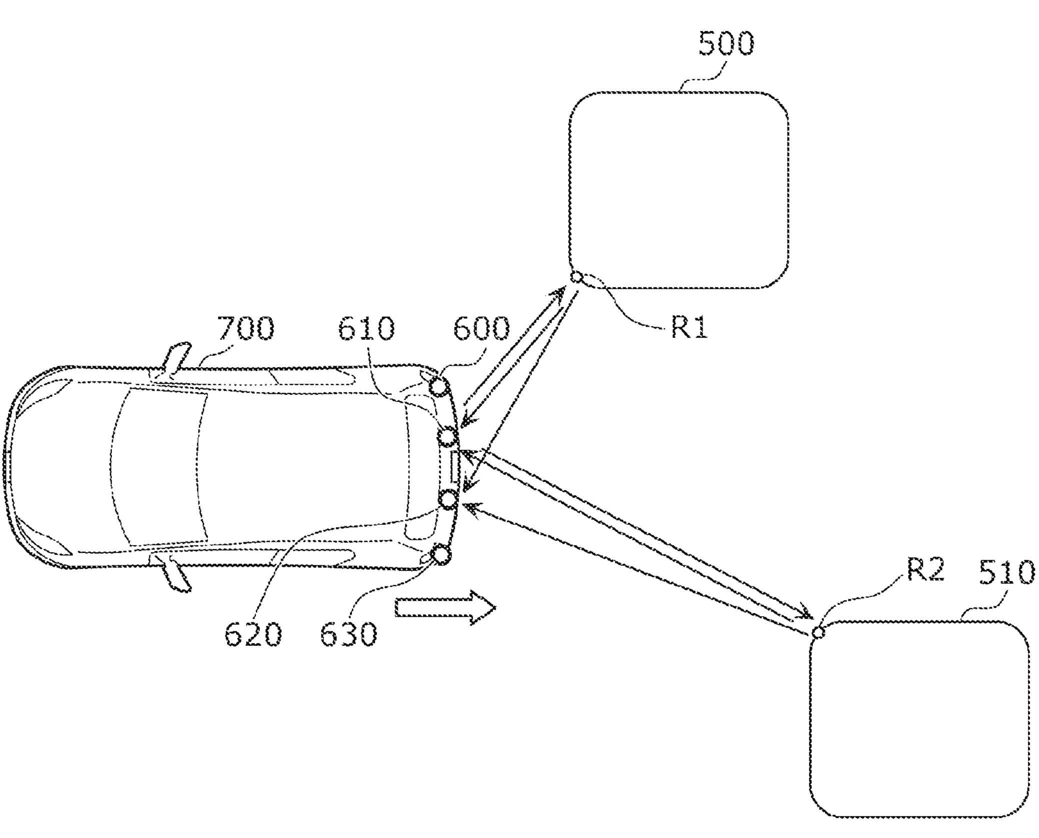
FIG. 7 is a diagram for explaining a positional relationship between a vehicle and objects.

FIG. 7 is a diagram for explaining a positional relationship between vehicle 700 and objects 500 and 510. In the example shown in FIG. 7, ultrasonic waves emitted by wave receiving sensor 610 are reflected by object 500 and detected by wave receiving sensors 610 and 620, and reflected by object 510 and detected by wave receiving sensors 610 and 620. Object 500 is located closer to vehicle 700 than object 510.

FIG. 8 is a diagram for explaining a relationship between detection results of range sensor 101 and positions of objects 500 and 510. A first sensor is wave receiving sensor 610, for example, and a second sensor is wave receiving sensor 620, for example. For example, a first wave is an ultrasonic wave detected first, and a second wave is an ultrasonic wave detected after the first wave. In the example shown in FIG. 7, wave receiving sensor 610 and wave receiving sensor 620 each detect the reflected wave from object 500 as the first wave and the reflected wave from object 510 as the second wave. Therefore, coordinates a calculated based on the first waves detected by wave receiving sensors 610 and 620 indicate reflection position R1 (i.e., the position of object 500). Coordinates b calculated based on the second waves detected by wave receiving sensors 610 and 620 indicate reflection position R2 (i.e., the position of object 510).

Therefore, when vehicle 700 and objects 500 and 510 are in the positional relationship as shown in FIG. 7, object estimator 206 estimates the positions of the objects (two third positions in this example) using the correspondence relationship as shown in FIG. 8, for example.

(Operations)

A processing procedure of obstacle detection apparatus 200 according to Embodiment 2 will be described next.

FIG. 9 is a flowchart showing a processing procedure of object estimator 206 according to Embodiment 2.

First, object estimator 206 calculates coordinates based on combinations according to an order in which reflected waves were returned (S201). Specifically, based on detection results of a plurality of wave receiving sensors (e.g., wave receiving sensors 610 and 620) included in range sensor 101, object estimator 206 determines combinations of waves using the order in which the waves were received by the plurality of wave receiving sensors. Object estimator 206 then calculates positions of objects using the determined combinations. More specifically, object estimator 206 receives, as input information, information on observed reflected waves from range sensor 101. Object estimator 206 then determines combinations of the reflected waves according to an order in which the reflected waves were returned and calculates coordinate positions of reflective objects by performing triangulation. In the example shown in FIG. 8, for example, object estimator 206 obtains, as detection results, information on two waves received by each of wave receiving sensors 610 and 620 from wave receiving sensors 610 and 620. Object estimator 206 further determines the first waves detected by wave receiving sensors 610 and 620 and the second waves detected by wave receiving sensors 610 and 620 as combinations of the waves. Object estimator 206 further calculates coordinates a based on the first waves detected by wave receiving sensors 610 and 620. Object estimator 206 further calculates coordinates b based on the second waves detected by wave receiving sensors 610 and 620. Coordinates a and coordinates b are each an example of the third position.

Next, object estimator 206 estimates a shape (type) of the object based on a distance from the wave receiving sensor to the object, which is derived from transmission time and reception time included in the detection results of range sensor 101, and received-wave power, which is the intensity of the wave when received by the wave receiving sensor (S202). For example, object estimator 206 estimates the shape of the object based on the detection results of range sensor 101 and the correspondence information shown in FIG. 6.

(Effects, etc.)

As described above, according to obstacle detection apparatus 200 of the present embodiment, object estimator 206 eliminates the need to store the object information (which is required as known information in obstacle detection apparatus 100, for example) in advance in storage 11, for example, thereby allowing for real-time derivation. Thus, even for an object having an unknown position and shape, object estimator 206 can estimate such a position and shape and perform simulation using a mathematical model.

Embodiment 3

Embodiment 3 will be described next. Note that the description of the present embodiment will focus on differences from the above-described embodiments.

An obstacle detection apparatus according to Embodiment 3 has a configuration similar to that of obstacle detection apparatus 200 according to Embodiment 2. The obstacle detection apparatus according to Embodiment 3 differs from obstacle detection apparatus 200 in processing of object estimator 206. Specifically, as with Embodiment 2, object estimator 206 in the present embodiment estimates a position and shape of an object based on detection results obtained from range sensor 101. When three or more estimated positions exist, however, object estimator 206 in the present embodiment determines possible combinations of the positions and performs object shape estimation for all of the combinations.

Figure 10:
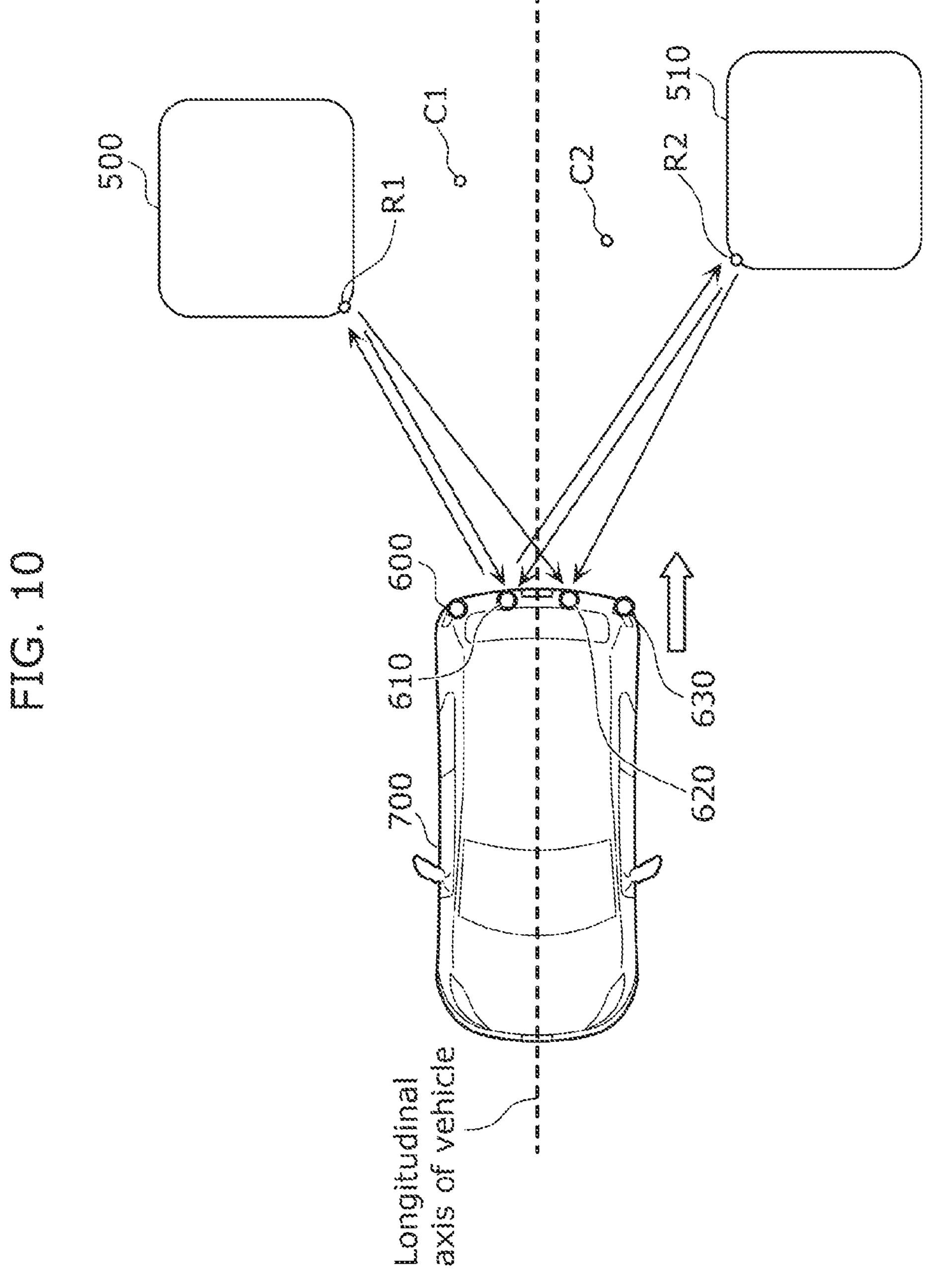
FIG. 10 is a diagram for explaining a positional relationship between the vehicle and the objects.

FIG. 10 is a diagram for explaining a positional relationship between vehicle 700 and objects 500 and 510.

In an example shown in FIG. 10, ultrasonic waves emitted by wave receiving sensor 610 are reflected by object 500 and detected by wave receiving sensors 610 and 620, and reflected by object 510 and detected by wave receiving sensors 610 and 620. In this example, the distance to vehicle 700 is similar between object 500 and object 510.

FIG. 11 is a diagram for explaining a relationship between the detection results of range sensor 101 and positions of objects 500 and 510. A first sensor is wave receiving sensor 610, for example, and a second sensor is wave receiving sensor 620, for example. In the example shown in FIG. 10, it is unclear whether a reflected wave from object 500 or object 510 is detected as a first wave or a second wave in each of wave receiving sensor 610 and wave receiving sensor 620.

In such a case, object estimator 206 calculates coordinates for possible combinations of the waves, for example. In the present example, object estimator 206 estimates, as third positions, coordinates a, which are calculated based on the first waves detected by wave receiving sensors 610 and 620, coordinates b, which are calculated based on the second waves detected by wave receiving sensors 610 and 620, coordinates c, which are calculated based on the second wave detected by wave receiving sensor 610 and the first wave detected by wave receiving sensor 620, and coordinate d, which are calculated based on the first wave detected by wave receiving sensor 610 and the second wave detected by wave receiving sensor 620. As a result, reflection positions R1 and R2 as well as calculated points C1 and C2, for example, are calculated as the third positions. For example, reflection position R1 corresponds to coordinates a, reflection position R2 corresponds to coordinates b, calculated point C1 corresponds to coordinates c, and calculated point C2 corresponds to coordinates d.

When three or more calculated third positions (four in this example) exist, object estimator 206 further determines combinations of the calculated third positions in which objects can be considered to be located. For example, regarding waves detected by a wave receiving sensor, a single detected wave corresponds to a single object even when a plurality of objects exist. In other words, information on the single detected wave is used to calculate a single set of coordinates and the information is not used to calculate another set of coordinates. Therefore, in this example, objects can be considered to be located at positions in either a combination of coordinates a and coordinates b, or a combination of coordinates c and coordinates d, for example. In other words, either a case where an object is located at each of coordinates a and coordinates b or a case where an object is located at each of coordinates c and coordinates d can be considered in this example. Object estimator 206 derives reflected waves by performing simulation for each of the determined combinations using a mathematical model, and determines an appropriate third position from among the three or more third positions based on the derived reflected waves.

As described above, when the number of the estimated third positions is three or more, for example, object estimator 206 determines a plurality of combinations of the three or more third positions (e.g., coordinates a and coordinates b, as well as coordinates c and coordinates d). For each of the plurality of combinations, object estimator 206 estimates shapes of objects assuming that the objects exist at two or more third positions in the combination. Object estimator 206 also determines one or more third positions from among the estimated three or more third positions based on the detection results of range sensor 101, and outputs, to simulator 103, object information including the determined one or more third positions and the shape of the object corresponding to each of the one or more third positions. Based on the object information obtained from object estimator 206, simulator 103 generates second information by calculating one or more second positions corresponding to the one or more third positions and shapes through simulation according to a second calculation method using the one or more third positions and shapes of the object(s) indicated by the object information. As described above, object estimator 206 derives reflected waves from the information of range sensor 101 using the mathematical model and calculates the position (third position) of the object based on the derived reflected waves. Simulator 103 calculates the position at which the wave emitted from the range sensor is reflected from the object as the position (the second position) of the object through simulation with the mathematical model using the third position of the object calculated by object estimator 206 and the shape of the object estimated by object estimator 206.

(Operations)

Figure 12:
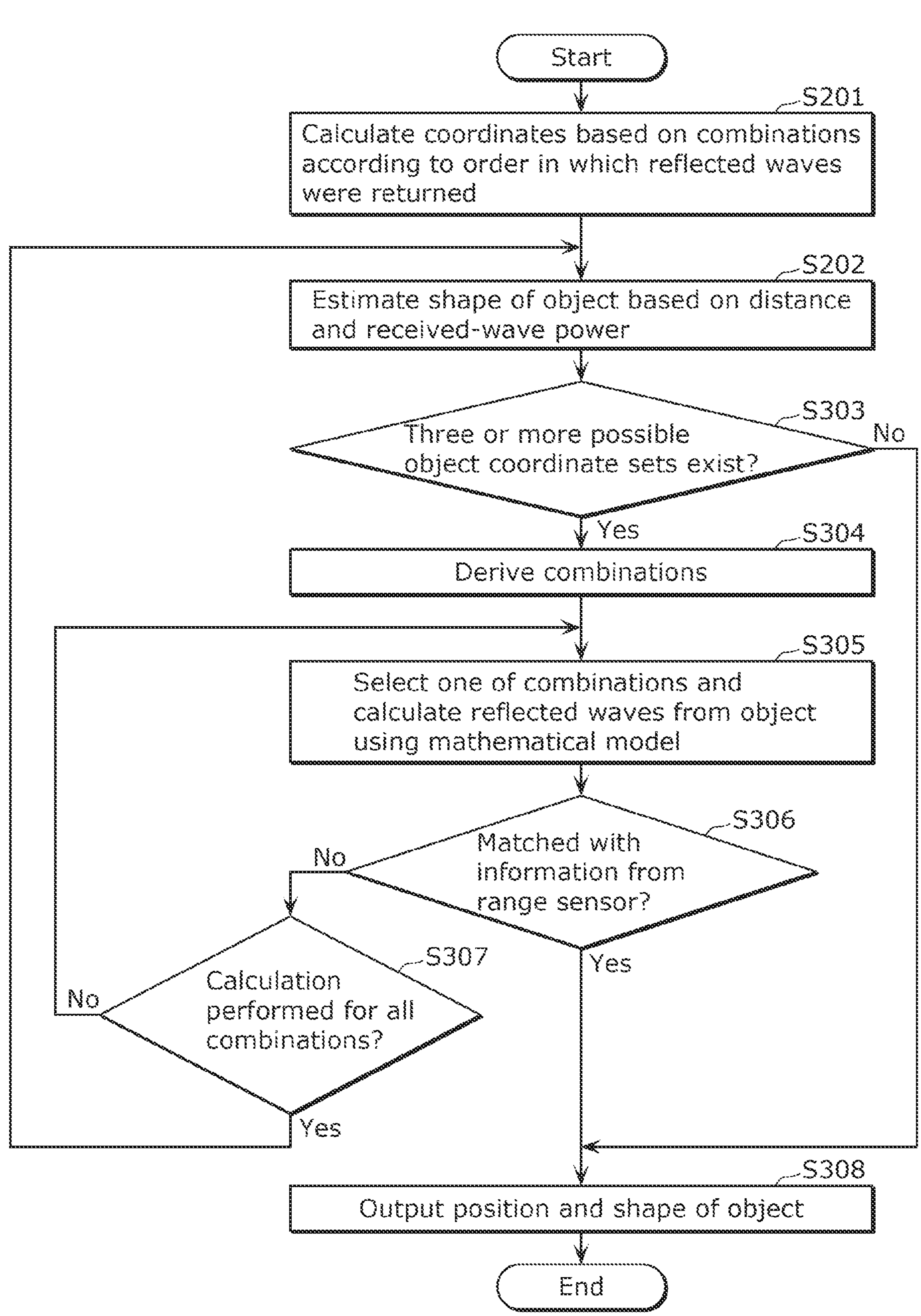
FIG. 12 is a flowchart showing a processing procedure of an obstacle detection apparatus according to Embodiment 3.

FIG. 12 is a flowchart showing a processing procedure of the obstacle detection apparatus according to Embodiment 3.

Specifically, FIG. 12 is a flowchart showing a processing procedure of object estimator 206 according to Embodiment 3.

First, object estimator 206 performs steps S201 and S202 described above.

Next, object estimator 206 determines whether three or more possible object positions (coordinate sets) exist (S303).

When three or more possible object positions are determined not to exist, i.e., when two or less possible object positions are determined to exist (No in S303), object estimator 206 outputs the estimated position and shape of the object to simulator 103 (S308) and terminates the process.

When three or more possible object positions are determined to exist (Yes in S303), on the other hand, object estimator 206 derives a plurality of combinations of the estimated positions (step S304).

Next, object estimator 206 selects one of the plurality of combinations, and calculates reflected waves (e.g., the intensity and spread of each reflected wave) by performing simulation using the mathematical model under the assumption that an object is present at each position in the selected combination (S305).

Next, object estimator 206 determines whether information on the calculated reflected waves matches the information on the reflected waves contained in the detection results of range sensor 101 (S306).

When those items of information are determined to match each other (Yes in S306), object estimator 206 outputs the position and shape of the selected object to simulator 103 (S308).

When those items of information are determined not to match each other (No in S306), object estimator 206 determines whether reflected waves have been calculated for all of the derived combinations (S307).

When object estimator 206 determines that the reflected waves have not been calculated for all of the combinations (No in S307), object estimator 206 returns the process to step S305, selects a combination for which reflected waves have not been calculated, and calculates the reflected waves through simulation using the mathematical model under the assumption that an object is present at each position in the selected combination.

When object estimator 206 determines that the reflected waves have been calculated for all of the combinations (Yes in S307), on the other hand, the shape of the object used in the simulation may be incorrect. Thus, object estimator 206 returns the process to step S202 and redoes the object shape estimation. In this case, object estimator 206 redoes the object estimation so that a shape different from the originally estimated shape of the object is determined, for example. In a case where object estimator 206 has selected the shape of the object corresponding to distance i and received-wave power j based on the correspondence information shown in FIG. 6, for example, object estimator 206 selects the shape of the object corresponding to one of cells around cell Eij, e.g., cells with distance i±1 and received-wave power j±1.

(Effects, etc.)

As described above, the obstacle detection apparatus according to the present embodiment can perform estimation for all of the possible object positions based on the reflected waves. Thus, the obstacle detection apparatus according to the present embodiment can estimate object positions more accurately than obstacle detection apparatus 200 according to Embodiment 2.

Embodiment 4

Embodiment 4 will be described next. Note that the description of the present embodiment will focus on differences from the above-described embodiments.

An obstacle detection apparatus according to Embodiment 4 has a configuration similar to that of obstacle detection apparatus 200 according to Embodiment 2. The obstacle detection apparatus according to Embodiment 4 differs from obstacle detection apparatus 200 in processing of object estimator 206. Specifically, as with Embodiment 2, object estimator 206 in the present embodiment estimates a position and shape of an object based on detection results obtained from range sensor 101. When three or more estimated positions exist, however, object estimator 206 in the present embodiment determines possible combinations of those positions. Object estimator 206 in the present embodiment selects, from among the possible combinations, a combination of positions located farthest from a traveling path of vehicle 700. Object estimator 206 estimates shapes of objects under the assumption that the objects are present at the positions in the selected combination. Specifically, when the number of estimated third positions is three or more, object estimator 206 determines a plurality of combinations of the three or more third positions. Here, object estimator 206 selects a combination including the third position located farthest from a virtual axis that extends in a front-back direction of vehicle 700 and passes through a center of vehicle 700 (e.g., the longitudinal axis of the vehicle shown in FIG. 10). Object estimator 206 then estimates the shapes of the objects under assumption that the objects are located at the two or more third positions in the combination.

(Operations)

Figure 13:
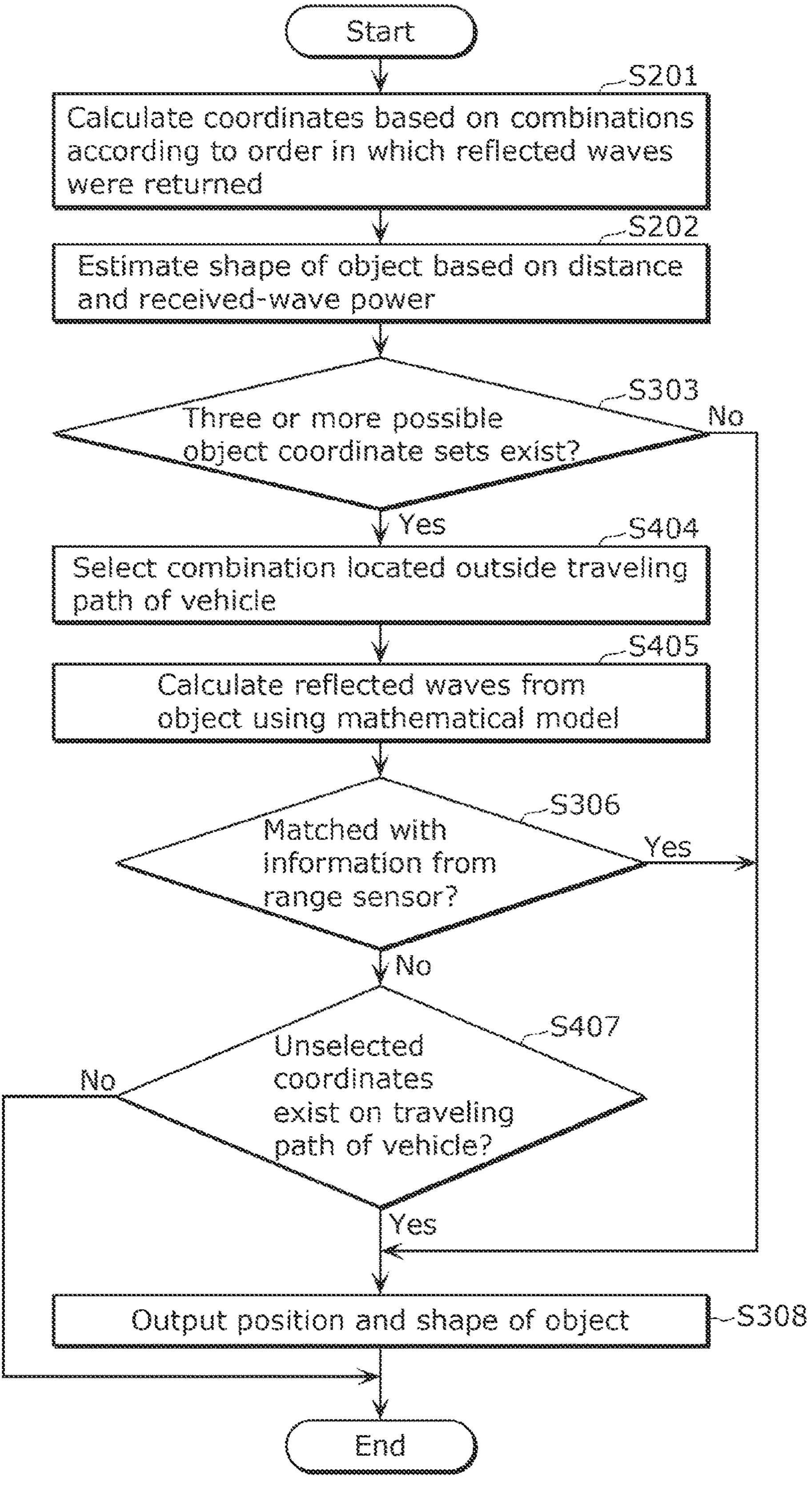
FIG. 13 is a flowchart showing a processing procedure of an obstacle detection apparatus according to Embodiment 4.

FIG. 13 is a flowchart showing a processing procedure of the obstacle detection apparatus according to Embodiment 4. Specifically, FIG. 13 is a flowchart showing a processing procedure of object estimator 206 according to Embodiment 4.

First, object estimator 206 performs steps S201, S202, and S303 described above.

When three or more possible object coordinate sets are determined not to exist, i.e., when two or less possible object coordinate sets are determined to exist (No in S303), object estimator 206 outputs the estimated position and shape of the object to simulator 103 (S308) and terminates the process.

When three or more possible object coordinate sets are determined to exist (Yes in S303), on the other hand, object estimator 206 selects a combination including a third position located outside the traveling path of vehicle 700 (S404). The expression "outside the traveling path of vehicle 700" refers to, for example, a region other than the path of vehicle 700 when vehicle 700 travels along the longitudinal axis of the vehicle shown in FIG. 10. In the example shown in FIG. 10, objects 500 and 510 as well as reflection positions R1 and R2 are located outside the traveling path of vehicle 700. In the example shown in FIG. 10, calculated points C1 and C2, on the other hand, are not located outside the traveling path of vehicle 700. In other words, in the example shown in FIG. 10, calculated points C1 and C2 are located on the traveling path of vehicle 700.

Next, object estimator 206 calculates reflected waves (e.g., the intensity and spread of each reflected wave) by performing simulation using a mathematical model under the assumption that an object is present at each position in the selected combination (S405).

Next, object estimator 206 determines whether information on the calculated reflected waves matches the information on the reflected waves contained in the detection results of range sensor 101 (S306).

When those items of information are determined to match each other (Yes in S306), object estimator 206 outputs the selected third position and shape to simulator 103 (S308) and terminates the process.

When those items of information are determined not to match each other (No in S306), object estimator 206 determines whether a position (coordinates) in an unselected combination exists on the traveling path of vehicle 700 (S407).

When a position (coordinates) in an unselected combination is determined to exist on the traveling path of vehicle 700 (Yes in S407), for example, object estimator 206 outputs in step S308, to simulator 103, the position in the unselected combination and the shape estimated by object estimator 206 in step S202.

On the other hand, when a position (coordinates) in an unselected combination is determined not to exist on the traveling path of vehicle 700 (No in S407), for example, the process goes to step S305 shown in FIG. 12, where object estimator 206 calculates reflected waves (e.g., the intensity and spread of each reflected wave) by performing simulation using the mathematical model under the assumption that an object is present at each position in the unselected combination.

(Effects, etc.)

As described above, the obstacle detection apparatus according to the present embodiment performs the above-described processes for a combination of object positions that can be considered based on reflected waves under the assumption that the objects are located at positions outside the traveling path of vehicle 700. Thus, the positions of the objects can be estimated with less calculation time. Moreover, since the estimation is performed under the assumption that the objects are located outside the traveling path of vehicle 700, vehicle 700 can travel when the detection result of range sensor 101 matches the simulation result generated by simulator 103. When the detection result of range sensor 101 and the simulation result generated by simulator 103 do not match each other and any remaining third position is located on the traveling path of vehicle 700, there is a risk of collision with the object. Thus, an ECU of vehicle 700, for example, may be commanded to perform a braking operation, thereby preventing an accident from occurring. For example, if Yes in step S407, the obstacle detection apparatus according to the present embodiment outputs information indicating the result of the determination in step S407 (e.g., the position in the combination that has not been selected by object estimator 206) to the ECU included in vehicle 700. If Yes in step S407, a possibility that vehicle 700 will collide with the object is high. Thus, the obstacle detection apparatus according to the present embodiment outputs the determination result to the ECU included in vehicle 700 to cause vehicle 700 to brake. As a result, vehicle 700 is brought to an emergency stop.

Embodiment 5

Embodiment 5 will be described next. Note that the description of the present embodiment will focus on differences from the above-described embodiments.

An obstacle detection apparatus according to Embodiment 5 has a configuration similar to that of obstacle detection apparatus 200 according to Embodiment 2. The obstacle detection apparatus according to Embodiment 5 differs from obstacle detection apparatus 200 in processing of object estimator 206. Specifically, as with Embodiment 2, object estimator 206 in the present embodiment estimates a position and shape of an object based on detection results obtained from range sensor 101. When three or more estimated positions exist, however, object estimator 206 in the present embodiment determines possible combinations of those positions. In such a possible combination, if all positions in the combination exist outside the traveling path of vehicle 700, object estimator 206 in the present embodiment determines a type (shape) of such an object as an object that is located at a position far from the traveling path of vehicle 700 and returns strong reflection, such as a wall or another vehicle. Specifically, when the number of estimated third positions is three or more, object estimator 206 determines a plurality of combinations of the three or more third positions. Object estimator 206 also determines whether the three or more third positions are located on the traveling path of vehicle 700 when vehicle 700 moves forward or backward. Object estimator 206 also assumes that an object is present at each of two or more third positions in a combination among the plurality of combinations, in which all of the two or more third positions are not located on the traveling path of vehicle 700. For example, object estimator 206 estimates the shape of such an object to be a shape having a reflectivity higher than a predetermined reflectivity.

Note that the predetermined reflectivity and the shape having the reflectivity higher than the predetermined reflectivity may be set arbitrarily. For example, an object such as a wall, which has a relatively large area to reflect waves, is an object with a shape having a reflectivity higher than the predetermined reflectivity. For example, an object such as a pole, which is long and narrow and has a relatively small area to reflect waves as compared to a wall, for example, is an object with a shape having a reflectivity lower than or equal to the predetermined reflectivity.

(Operations)

Figure 14:
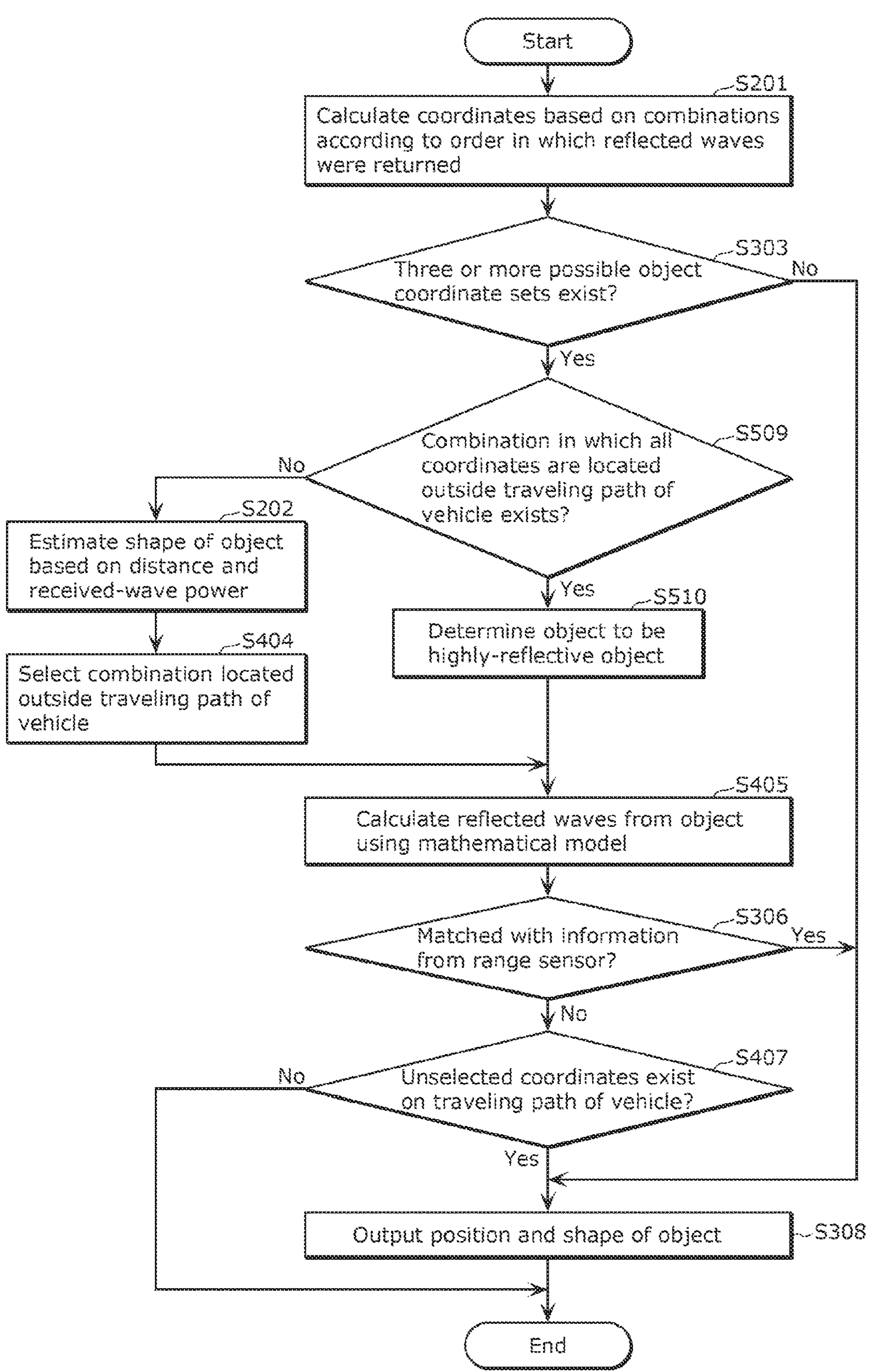
FIG. 14 is a flowchart showing a processing procedure of an obstacle detection apparatus according to Embodiment 5.

FIG. 14 is a flowchart showing a processing procedure of the obstacle detection apparatus according to Embodiment 5. Specifically, FIG. 14 is a flowchart showing a processing procedure of object estimator 206 according to Embodiment 5.

First, object estimator 206 performs steps S201 and S303 described above.

When three or more possible object coordinate sets are determined not to exist, i.e., when two or less possible object coordinate sets are determined to exist (No in S303), object estimator 206 outputs the estimated position and shape of such an object to simulator 103 (S308) and terminates the process.

When three or more possible object coordinate sets are determined to exist (Yes in S303), on the other hand, object estimator 206 determines whether a combination in which all positions (coordinates) are located outside the traveling path of vehicle 700 exists among the plurality of combinations (S509).

When a combination in which all positions (coordinates) are located outside the traveling path of vehicle 700 is determined not to exist among the plurality of combinations (No in S509), object estimator 206 performs the process of step S202 and then performs the processes from step S404 onward.

When a combination in which all positions (coordinates) are located outside the traveling path of vehicle 700 is determined to exist among the plurality of combinations (Yes in S509), on the other hand, object estimator 206 selects the combination and determines that a highly-reflective object (an object with a shape having a reflectivity higher than the predetermined reflectivity) exists as an object at each of the positions in that combination (S510). Subsequently, object estimator 206 performs the processes from step S405 onward.

(Effects, etc.)

As described above, according to the obstacle detection apparatus of the present embodiment, under the limited conditions where a combination in which all positions are located outside the traveling path of vehicle 700 exists among the combinations of the object positions that can be considered based on reflected waves, it can be assumed that vehicle 700 can pass through between the objects and strong reflection is returned from such an object. Therefore, calculation time to identify the shape of the object can be significantly reduced. In addition, since the estimation is performed under the assumption that the objects are located outside the traveling path of vehicle 700, vehicle 700 can travel when the detection result of range sensor 101 and the simulation result generated by simulator 103 match each other. When those results do not match each other and any remaining third position is located on the traveling path of vehicle 700, there is a risk that vehicle 700 will collide with the object. Thus, an ECU of vehicle 700, for example, may be commanded to perform a braking operation, thereby preventing an accident from occurring.

Embodiment 6

Embodiment 6 will be described next. Note that the description of the present embodiment will focus on differences from the above-described embodiments.

(Configuration)

Figure 15:
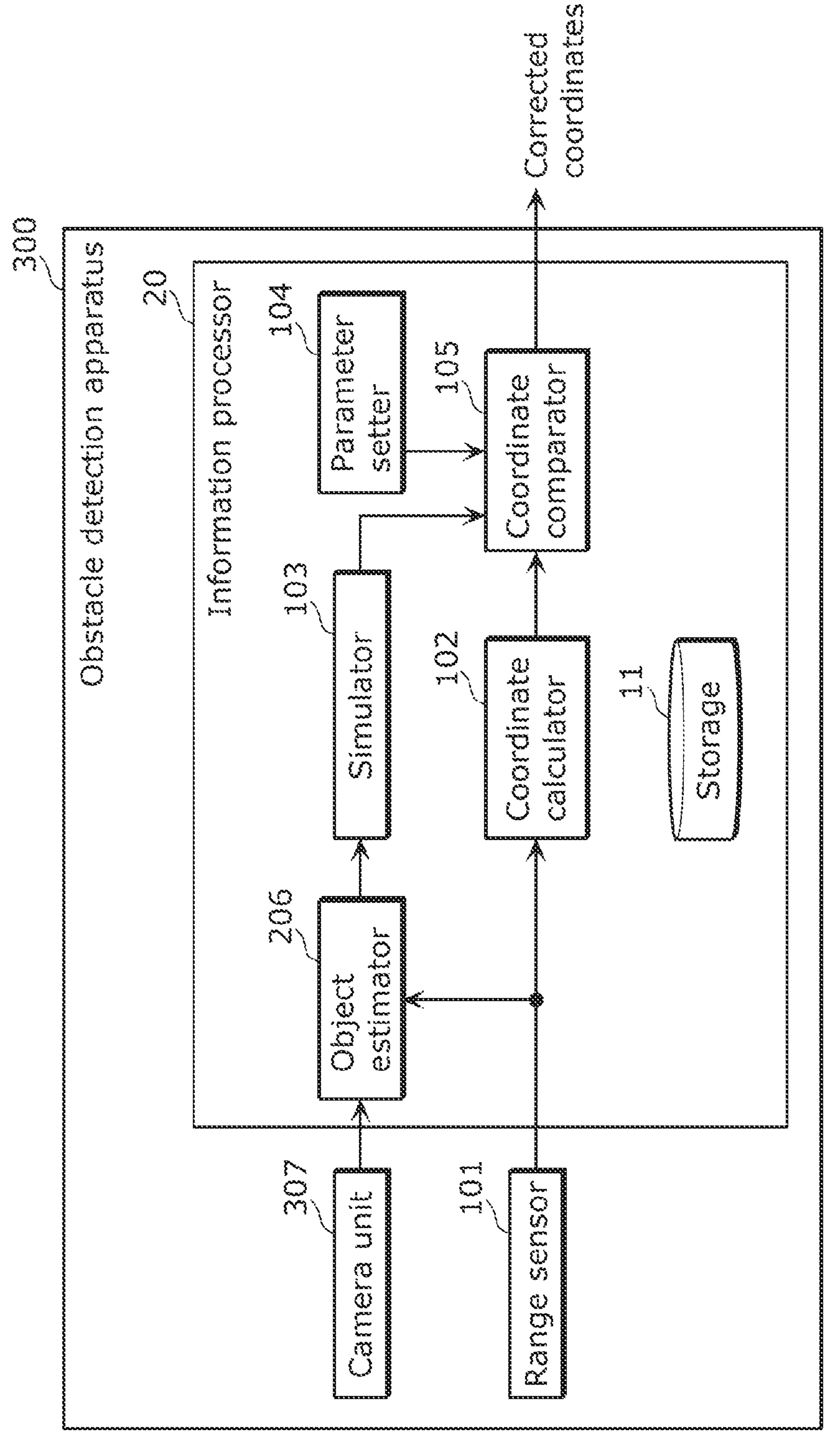
FIG. 15 is a block diagram illustrating a configuration of an obstacle detection apparatus according to Embodiment 6.

FIG. 15 is a block diagram illustrating a configuration of obstacle detection apparatus 300 according to Embodiment 6.

Obstacle detection apparatus 300 further includes camera unit 307 in addition to the configuration of obstacle detection apparatus 200.

Camera unit 307 is a device that captures an image around vehicle 700 by a camera to obtain the image (image information) and performs an image analysis on the obtained image to estimate the presence or absence of an object, a shape of the object, and a position of the object. For example, camera unit 307 estimates the position of the object by performing triangulation using the generated image. Camera unit 307 outputs the estimation result to object estimator 206.

Camera unit 307 is implemented, for example, by the camera, a processor, a memory having stored therein a control program to be executed by the processor, and a communication interface for communicating with information processor 10.

Object estimator 206 according to the present embodiment generates object information based on a detection result (specifically, received-wave information) of range sensor 101 and the image captured by the camera in camera unit 307, for example. Specifically, object estimator 206 generates the object information based on the received-wave information and the position of the object calculated by performing triangulation using the image captured by the camera (e.g., the estimation result generated by camera unit 307).

Object estimator 206 according to the present embodiment may generate the object information, for example, using a detection result from any sensor of a type different from range sensor 101, instead of the image information from camera unit 307. For example, object estimator 206 generates the object information based on the received-wave information and sensor information obtained from a predetermined sensor of a type different from range sensor 101. As described above, the predetermined sensor is a camera, for example, and object estimator 206 generates the object information based on the received-wave information and the shape of the object obtained by processing the image captured by the camera. The predetermined sensor is, for example, the camera included in camera unit 307, but may be any sensor other than the camera. For example, the predetermined sensor may be a sensor different from the range sensor, such as one of an ultrasonic sensor, a radar, or a lidar.

(Operations)

A processing procedure of obstacle detection apparatus 300 according to Embodiment 6 will be described next. Specifically, a processing procedure of each of camera unit 307 and object estimator 206 included in obstacle detection apparatus 300 according to Embodiment 6 will be described.

Figure 16:
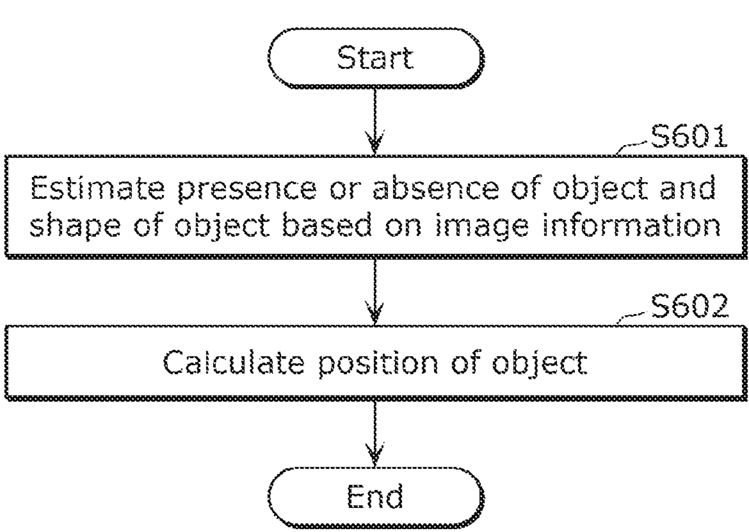
FIG. 16 is a flowchart showing a processing procedure of a camera unit according to Embodiment 6.

FIG. 16 is a flowchart showing the processing procedure of camera unit 307 according to Embodiment 6.

First, camera unit 307 generates an image by capturing the image by the camera, and performs an image analysis on the generated image to estimate the presence or absence of an object. When an object exists, camera unit 307 estimates a type (shape) of the object (S601). For example, camera unit 307 determines whether the object in the image is, for example, another vehicle, a person, or something else. For example, camera unit 307 estimates the shape of the object by determining the object in the image to be a pole if the object is longer and narrower than a predetermined size and determining the object in the image to be a wall if the object is larger than the predetermined size.

Next, camera unit 307 calculates a position of the object by performing triangulation based on the image, for example (S602).

Camera unit 307 outputs the thus calculated information on the object to object estimator 206.

Figure 17:
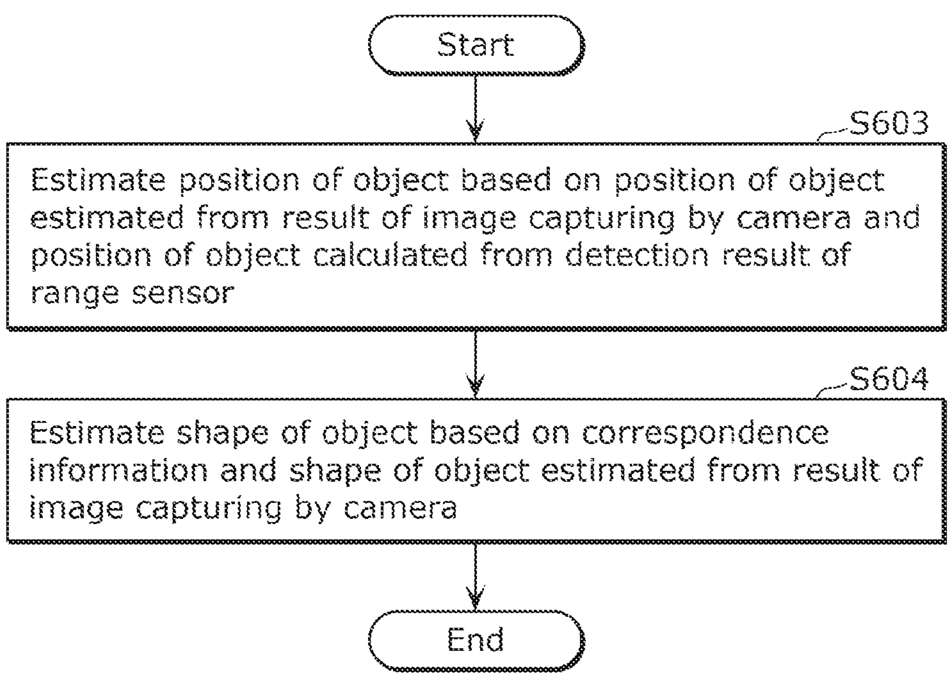
FIG. 17 is a flowchart showing a processing procedure of an object estimator according to Embodiment 6.

FIG. 17 is a flowchart showing the processing procedure of object estimator 206 according to Embodiment 6.

First, object estimator 206 obtains an estimation result from camera unit 307 and obtains a detection result from range sensor 101. Object estimator 206 estimates a position (third position) of the object based on the estimation result obtained from camera unit 307, i.e., the position of the object estimated from the result of the image capturing by the camera (the image generated by the camera) as well as the position of the object calculated from the detection result of range sensor 101 (S603). For example, object estimator 206 compares the position of the object estimated from the result of the image capturing by the camera with the position of the object calculated from the detection result of range sensor 101, and selects, as the third position, one of the positions at which the object is more likely to exist. Which one of the position of the object estimated from the result of the image capturing by the camera or the position of the object calculated from the detection result of range sensor 101 should be determined as a position at which the object is more likely to exist may be set arbitrarily. For example, when those objects are located less than a predetermined distance from vehicle 700, the position of the object estimated from the result of the image capturing by the camera may be given priority and estimated as the third position. When those objects are located more than or equal to the predetermined distance from vehicle 700, the position of the object calculated from the detection result of range sensor 101 may be given priority and estimated as the third position. The predetermined distance may be set arbitrarily.

Next, object estimator 206 estimates a shape (type) of the object based on correspondence information indicating a relationship between a distance from range sensor 101 to the object and received-wave power as well as the shape (type) of the object estimated from the result of the image capturing by camera unit 307 (step S604). For example, object estimator 206 compares the shape of the object estimated from the correspondence information with the shape of the object estimated from the result of the image capturing by the camera and selects, as its object shape, one of the shapes having a higher possibility. Which one of the shape of the object based on the correspondence information or the shape of the object estimated from the result of the image capturing by the camera should be determined as its object shape may be set arbitrarily. For example, when those objects are located less than a predetermined distance from vehicle 700, the shape of the object estimated from the result of the image capturing by the camera may be given priority. When those objects are located more than or equal to the predetermined distance from vehicle 700, the shape of the object determined from the correspondence information may be given priority. The predetermined distance may be set arbitrarily.

(Effects, etc.)

As described above, the obstacle detection apparatus according to the present embodiment estimates the position and shape of the object using the information on the position and shape of the object obtained through the image analysis by camera unit 307 in addition to the detection result obtained from range sensor 101. Thus, the position and shape of the object can be estimated even more accurately.

Embodiment 7

Embodiment 7 will be described next. Note that the description of the present embodiment will focus on differences from the above-described embodiments.

(Configuration)

FIG. 18 is a block diagram illustrating a configuration of obstacle detection apparatus 400 according to Embodiment 7. Obstacle detection apparatus 400 includes information processor 40 different from the information processor in obstacle detection apparatus 200. Information processor 40 further includes object confirmer 408 in addition to the configuration of information processor 20. In other words, obstacle detection apparatus 400 further includes object confirmer 408 in addition to the configuration of obstacle detection apparatus 200.

Object confirmer 408 determines whether a first position indicated by first information generated using a first detection result of range sensor 101 at a first point in time matches a second position calculated by performing simulation according to a second calculation method using a third position generated using a second detection result of range sensor 101 at a second point in time that is before the first point in time.

Range sensor 101 repeatedly detects an object. Coordinate calculator 102, for example, repeatedly obtains a detection result from range sensor 101 and repeatedly calculates a first position based on the obtained detection result. Object estimator 206, for example, repeatedly obtains the detection result from range sensor 101 and repeatedly generates object information indicating, for example, a third position and a shape of the object based on the obtained detection result. Simulator 103, for example, repeatedly obtains the object information from object estimator 206 and repeatedly calculates a second position based on the obtained object information. Object confirmer 408 then determines whether the position of the object currently calculated by simulator 103 is appropriate using the position of the object calculated in the past by coordinate calculator 102. Object confirmer 408 determines whether the second position of the object calculated by simulator 103 using the object information such as the position and shape of the object estimated by object estimator 206 based on the detection result of range sensor 101 at a certain point in time that is before the present point in time matches the first position calculated by coordinate calculator 102 based on the detection result of range sensor 101 at the present point in time, for example. When those positions match each other, object confirmer 408 outputs the calculation result of simulator 103 to coordinate comparator 105, for example. When those positions do not match each other, on the other hand, object confirmer 408 outputs, to object estimator 206, an instruction to re-estimate the position and/or shape of the object.

When object estimator 206 receives such an instruction, for example, object estimator 206 re-estimates the shape of the object to be a shape different from the estimated object shape. Simulator 103 calculates the second position by performing simulation using the re-estimated object shape.

(Operations)

A processing procedure of obstacle detection apparatus 400 according to Embodiment 7 will be described next. Specifically, a processing procedure of each of object confirmer 408 and object estimator 206 included in obstacle detection apparatus 400 will be described.

Figure 19:
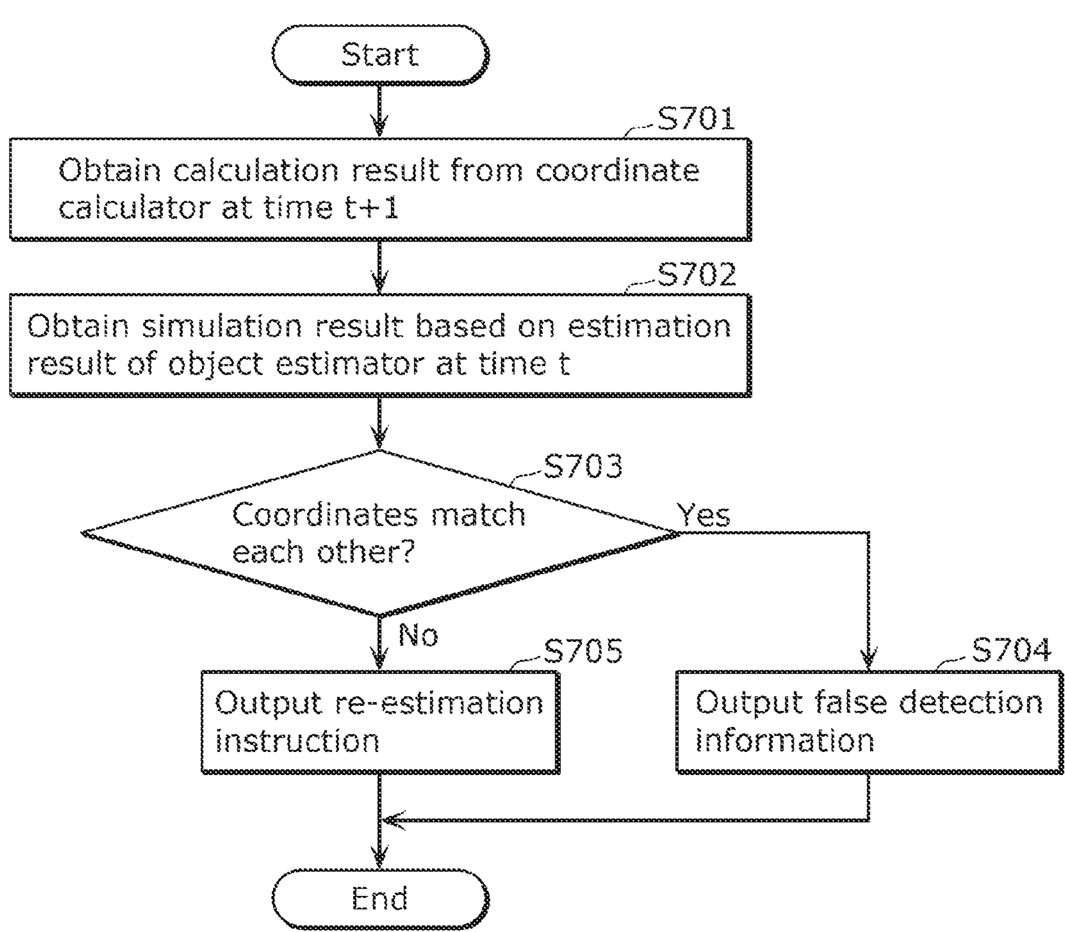
FIG. 19 is a flowchart showing a processing procedure of an object confirmer according to Embodiment 7.

FIG. 19 is a flowchart showing the processing procedure of object confirmer 408 according to Embodiment 7.

First, object confirmer 408 obtains, from coordinate calculator 102, position information indicating a first position calculated based on a detection result of range sensor 101 at time t+1 (S701). Time t+1 is an example of the first point in time.

Object confirmer 408 obtains, from simulator 103, false detection information indicating a second position calculated based on a third position calculated based on a detection result of range sensor 101 at time t (S702). Time t is an example of the second point in time.

The order in which steps S701 and S702 are performed may be arbitrary. Step S702 may be performed before step S701, or step S701 and step S702 may be performed simultaneously.

Object confirmer 408 determines whether the first position (coordinates) indicated by the obtained position information and the second position (coordinates) indicated by the obtained false detection information match each other (S703).

When those positions (coordinates) are determined to match each other (Yes in S703), object confirmer 408 outputs, to coordinate comparator 105, false detection information indicating a second position calculated based on a third position calculated based on the detection result of range sensor 101 at time t+1 (S704).

When those positions (coordinates) are determined not to match each other (No in S703), on the other hand, object confirmer 408 outputs, to object estimator 206, an instruction (re-estimation instruction) to perform re-estimation based on the detection result of range sensor 101 at time t+1 (step S705). The re-estimation instruction includes, for example, a flag to cause object estimator 206 to perform the re-estimation, and the object shape estimation result generated by object estimator 206 based on the detection result of range sensor 101 at time t.

This causes object estimator 206 to perform processing for the object shape estimation based on the detection result of range sensor 101 at time t+1.

Figure 20:
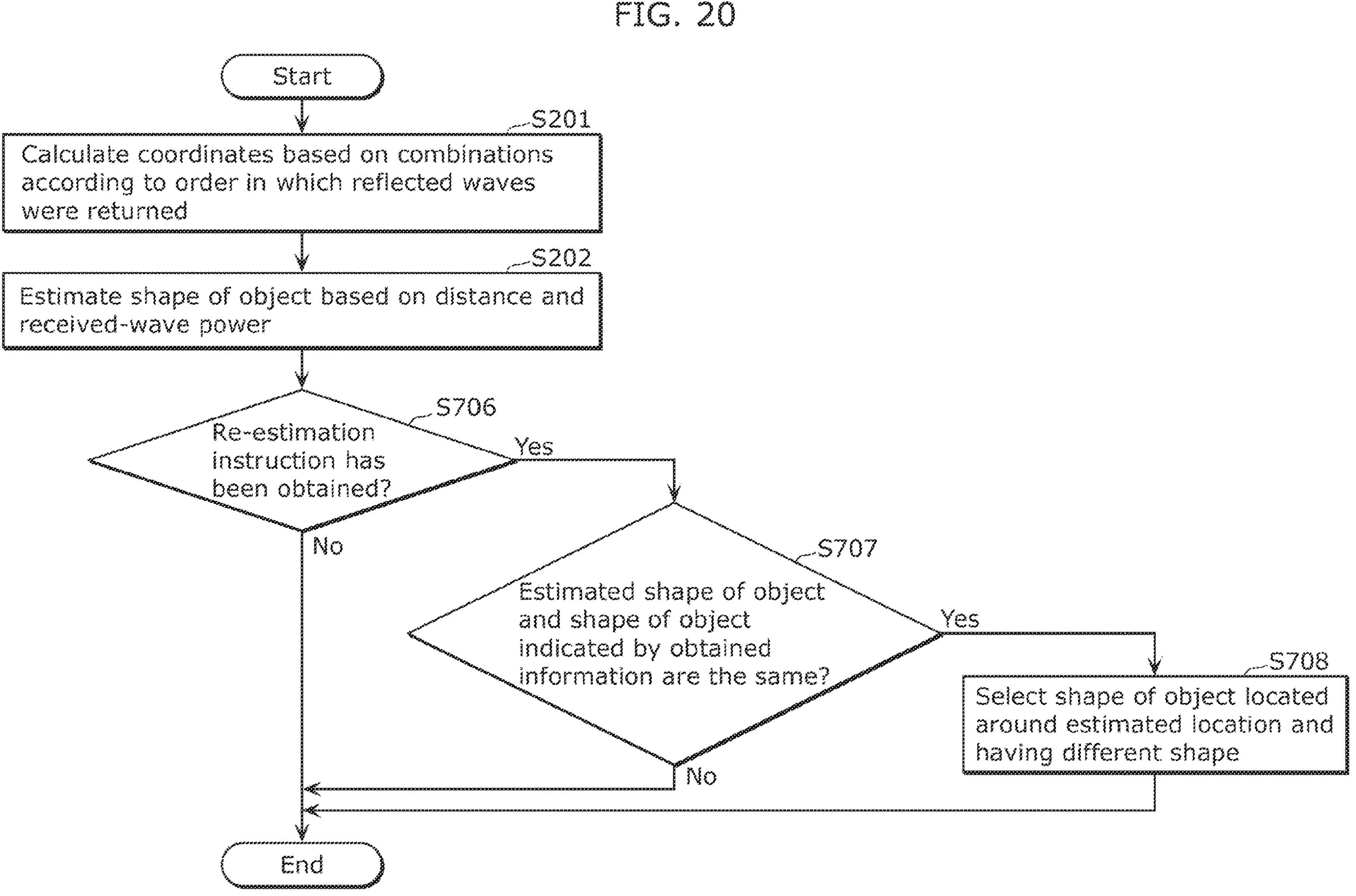
FIG. 20 is a flowchart showing a processing procedure of an object estimator according to Embodiment 7.

FIG. 20 is a flowchart showing the processing procedure of object estimator 206 according to Embodiment 7.

First, object estimator 206 performs steps S201 and S202 described above. Object estimator 206 thereby estimates the third position and shape of the object based on the detection result of range sensor 101 at time t+1, for example.

Next, object estimator 206 determines whether the re-estimation instruction has been obtained from object confirmer 408 (S706). For example, object estimator 206 determines whether the information obtained from object confirmer 408 contains the flag.

When object estimator 206 determines that the re-estimation instruction has not been obtained from object confirmer 408 (No in S706), object estimator 206 outputs, to simulator 103, the object information generated by performing steps S201 and S202 described above. Simulator 103 thereby calculates a second position based on the object information generated based on the detection result of range sensor 101 at time t+1, and outputs, to object confirmer 408, false detection information indicating the calculation result. Object confirmer 408 forwards the obtained false detection information to coordinate comparator 105.

When object estimator 206 determines that the re-estimation instruction has been obtained from object confirmer 408 (Yes in S706), on the other hand, object estimator 206 determines whether the shape of the object estimated by performing step S202 described above and the shape of the object contained in the information obtained from object confirmer 408 are the same (S707).

When those shapes are determined to be different from each other (No in S707), object estimator 206 outputs, to simulator 103, the object information generated by performing steps S201 and S202 described above.

Figure 21:
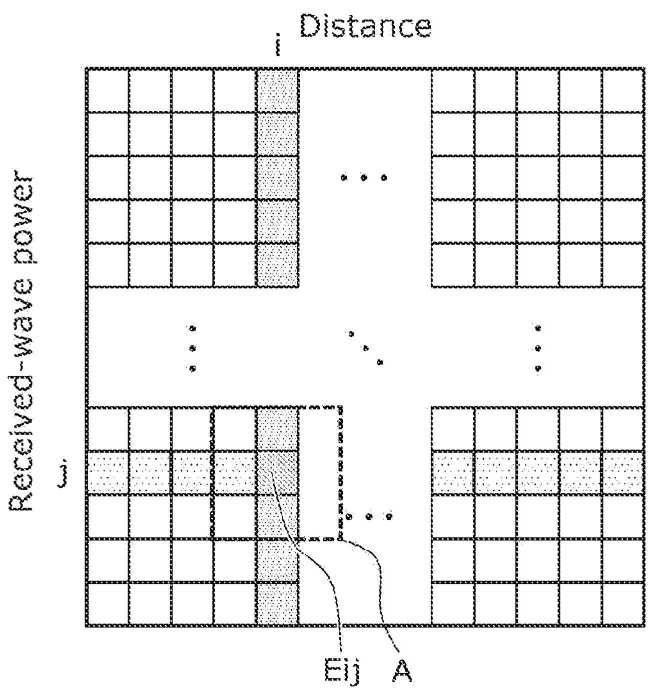
FIG. 21 is a diagram for explaining a process to be performed by the object estimator according to Embodiment 7 to determine a shape of an object.

When those shapes are determined to be the same (Yes in S707), on the other hand, object estimator 206 determines a shape of the object that is indicated by one of cells located around the corresponding location in correspondence information used to estimate the shape of the object (e.g., one of cells surrounding any one of cells in correspondence information shown in FIG. 21) and that is different from the shape of the object contained in the information obtained from object confirmer 408 (S708).

FIG. 21 is a diagram for explaining a process to be performed by object estimator 206 to determine a shape of an object.

As shown in FIG. 21, assume that object estimator 206 has selected the shape of the object corresponding to the location of cell Eij in step S202, for example. In this case, when the selected shape of the object and the shape of the object contained in the information obtained from object confirmer 408 are the same, for example, object estimator 206 selects a shape of the object corresponding to one of cells within dashed line box A shown in FIG. 21 excluding cell Eij.

Note that dashed line box A may be set arbitrarily. When object shapes corresponding to the cells within dashed line box A are all the same, for example, object estimator 206 may increase the number of options for object shapes by enlarging dashed line box A.

(Effects, etc.)

As described above, according to obstacle detection apparatus 400 of the present embodiment, object estimator 206 checks if the first position calculated by coordinate calculator 102 based on the detection result of range sensor 101 and the third position calculated by object estimator 206 at the same point in time match each other, for example. In addition, object confirmer 408 checks if the second position calculated using the third position estimated based on the detection result of range sensor 101 at a certain point in time and the first position calculated based on the detection result of range sensor 101 at a later point in time are the same. This can reduce the possibility of filtering out the first position based on the second position incorrectly calculated when the third position is a false position, for example. Thus, obstacle detection apparatus 400 can further reduce the occurrence of such incorrect calculation of object positions.

(Brief Overview)

Figure 22:
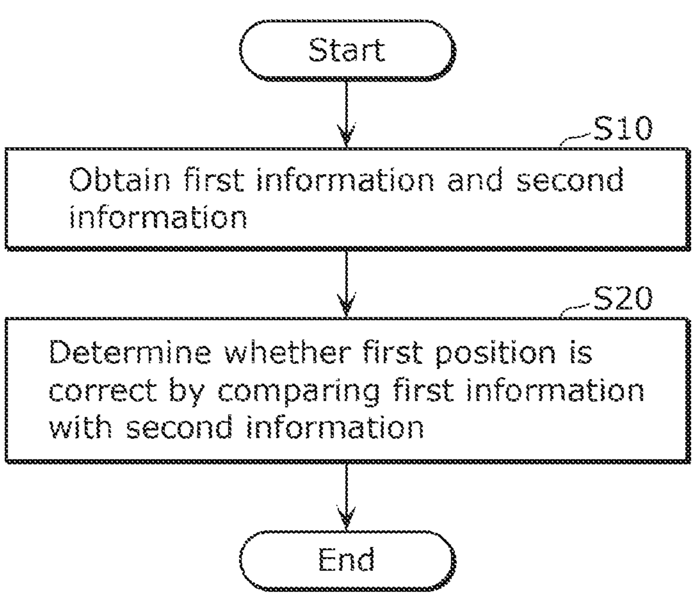
FIG. 22 is a flowchart showing a processing procedure of an information processing apparatus according to an aspect of the present disclosure.

FIG. 22 is a flowchart showing a processing procedure of an information processing apparatus according to an aspect of the present disclosure.

First, the information processing apparatus obtains first information indicating a first position of an object calculated according to a first calculation method based on a detection result of range sensor 101, and second information indicating a second position of the object calculated through simulation according to a second calculation method different from the first calculation method (S10).

Next, the information processing apparatus determines whether the first position is correct by comparing the first information with the second information (S20).

The first information is, for example, position information. The second information is, for example, false detection information. An obtainer and a comparator correspond to coordinate comparator 105, for example. The information processing apparatus is, for example, obstacle detection apparatus 100, 200, 300, or 400. The information processing apparatus may be implemented by information processor 10, 20, or 40, for example.

Next, the information processing apparatus outputs the determination result to vehicle 700, for example. This enables vehicle 700 to perform appropriate control based on the determination result. In addition, if the determination result is displayed on a display device such as a display, for example, the driver can know the correct position of the object.

Exemplary technologies that can be obtained from the disclosure of this specification will be presented below, and the effects, etc. that can be obtained from the exemplary technologies will be described below.

A first aspect of the present disclosure provides an information processing apparatus including: an obtainer that obtains first information indicating a first position of an object, which has been calculated based on a detection result of range sensor 101 according to a first calculation method, and second information indicating a second position of the object, which has been calculated through simulation according to a second calculation method different from the first calculation method; and a comparator that determines whether the first position is correct by comparing the first information with the second information.

When distance is calculated from reflected waves from an object based on a detection result of a range sensor, for example, false detection such that the object is detected at a position different from its actual position may occur due to influences of interference from reflected waves from the ground or steps, and disturbances from the external environment, for example. If such false detection occurs, an object may be determined to exist even though the object does not exist, thus leading to the application of the brakes. Conversely, an object may be determined not to exist even though the object actually exists, thus leading to a collision with the object. As just described, false detection may lead to an accident.

In order to reduce the occurrence of such false detection, PTL 1 mentioned above discloses a method including: calculating coordinate positions based on received-wave information; determining a confidence level of a position (coordinates) that is continuously detected at the same position to be high; and eliminating, as false detection, other positions that are detected at varied positions.

The method disclosed in PTL 1 mentioned above, however, can only handle false detection at varied positions and cannot handle false detection that repeatedly appears at the same position.

In view of the above, the present disclosure provides, for example, an information processing apparatus that can reduce the occurrence of false detection of objects.

Specifically, in a conventional method of calculating a position of an object by performing triangulation based on, for example, detection results of a range sensor such as a lidar using a principle such as time of flight (TOF), when two range sensors detect reflected waves from different objects, the positions (coordinates) of the objects calculated from the detection results may include incorrect coordinates. For example, an object may be calculated to exist at intersection C shown in FIG. 1. Therefore, in order to filter out such incorrect coordinates that are generated due to the principle such as the positional relationship calculated from the detection results of range sensor 101, the position of the object is calculated by using the plurality of calculation methods including, for example, the simulation using the mathematical model described above, and then the calculation results are compared with each other. Thus, even when positions (first positions) of objects calculated according to the first calculation method, such as triangulation, include incorrect coordinates, whether the positions of the objects calculated according to the first calculation method are appropriate can be determined by using positions (second positions) of the objects calculated according to the second calculation method, such as the mathematical model, which is different from the first calculation method. This allows the information processing apparatus to reduce the occurrence of false detection of objects. Therefore, this information processing apparatus can be useful even for invariable false detection such as false detection that occurs due to the principle of range sensor 101, for example, and can handle, for example, erroneous braking of vehicle 700 due to false detection.

A second aspect of the present disclosure provides the information processing apparatus according to the first aspect of the present disclosure, further including coordinate calculator 102 that generates the first information by calculating the first position based on the detection result according to the first calculation method.

According to this, the first information may be generated by coordinate calculator 102.

A third aspect of the present disclosure provides the information processing apparatus according to the first or second aspect of the present disclosure, further including simulator 103 that generates the second information by calculating the second position through the simulation according to the second calculation method, using object information indicating a third position of the object and a shape of the object as well as vehicle information regarding vehicle 700 in/to which range sensor 101 is provided.

According to this, the second information may be generated by simulator 103.

A fourth aspect of the present disclosure provides the information processing apparatus according to the third aspect of the present disclosure, in which the comparator determines whether the first position is correct by determining whether the first position and the second position are located within a predetermined distance.

The predetermined distance is, for example, a parameter that is set by parameter setter 104.

According to this, in a case where the first and second positions do not completely match each other, but are almost the same and a driver, for example, wishes to treat these positions as matching each other completely, the determination result as desired by the driver, for example, can be obtained by setting the predetermined distance appropriately.

A fifth aspect of the present disclosure provides the information processing apparatus according to the third or fourth aspect of the present disclosure, in which range sensor 101 emits a radio wave or a sound wave and detects a reflected wave which is the radio wave or the sound wave reflected from the object, and object estimator 206 that generates the object information by estimating the third position based on received-wave information indicating strength of the reflected wave detected by range sensor 101, which is included in the detection result, is further included.

According to this, the object information may be generated by object estimator 206.

A sixth aspect of the present disclosure provides the information processing apparatus according to the fifth aspect of the present disclosure, in which when the number of the third positions estimated is three or more, object estimator 206 determines a plurality of combinations of the three or more third positions, and for each of the plurality of combinations, object estimator 206 estimates the shape of the object under an assumption that the object is present at each of two or more third positions in the combination.

Object estimator 206 calculates the third position by performing the same calculation as coordinate calculator 102 based on the detection result of range sensor 101, for example. When a plurality of positions (specifically, three or more positions) have been estimated as third positions, for example, there is a possibility that incorrect coordinates have been calculated by coordinate calculator 102. When three or more positions have been estimated as third positions, not all of the three or more positions are necessarily correct. In many cases, some of the three or more positions are correct. In view of this, the information processing apparatus determines pairs from among the three or more positions, for example, and performs simulation for each of the determined pairs. This eliminates, when a correct pair is selected, for example, the need to calculate the remaining pair(s), thus possibly reducing the amount of the processing.

A seventh aspect of the present disclosure provides the information processing apparatus according to the fifth aspect of the present disclosure, in which when the number of the third positions estimated is three or more, object estimator 206 determines a plurality of combinations of the three or more third positions, and object estimator 206 selects a combination including the third position that is located farthest from a virtual axis extending in a front-back direction of vehicle 700 and passing through the center of vehicle 700, and estimates the shape of the object under an assumption that the object is present at each of two or more third positions in the combination.

The virtual axis is, for example, the above-described longitudinal axis of the vehicle.

According to this, the position of the object can be narrowed down to some extent in advance at the beginning of the calculation. This allows the position of the object to be estimated with less calculation time. In addition, the calculation is performed under the assumption that the object is far from vehicle 700. As a result, when a second position calculated from such a third position is different from the first position, i.e., when the first position includes incorrect coordinates, for example, there is a possibility that the object is located close to vehicle 700. Therefore, an accident can be prevented from occurring by causing vehicle 700 to be immediately stopped, for example.

An eighth aspect of the present disclosure provides the information processing apparatus according to the fifth aspect of the present disclosure, in which when the number of the third positions estimated is three or more, object estimator 206 determines a plurality of combinations of the three or more third positions, object estimator 206 determines whether the three or more third positions are located on a traveling path of vehicle 700 when vehicle 700 moves forward or backward, and object estimator 206 assumes that in a combination among the plurality of combinations, in which none of two or more third positions are located on the traveling path of vehicle 700, the object is present at each of the two or more third positions, and estimates the shape of the object to be a shape having a reflectivity higher than a predetermined reflectivity.

According to this, the position of the object can be narrowed down to some extent in advance at the beginning of the calculation. This allows the position of the object to be estimated with less calculation time. In addition, the calculation is performed under the assumption that no object exists on the traveling path of vehicle 700. As a result, when a second position calculated from such a third position is different from the first position, i.e., when the first position includes incorrect coordinates, for example, there is a possibility that the object is located on the traveling path of vehicle 700. Therefore, an accident can be prevented from occurring by causing vehicle 700 to be immediately stopped, for example.

A ninth aspect of the present disclosure provides the information processing apparatus according to any one of the fifth to eighth aspects of the present disclosure, in which object estimator 206 generates the object information based on the received-wave information and sensor information obtained from a predetermined sensor of a type different from range sensor 101.

The predetermined sensor is, for example, the camera included in the camera unit.

According to this, the third position and shape of the object can be estimated more accurately.

The predetermined sensor may be other than the camera and is not limited to any particular type of sensor. For example, the predetermined sensor may be a sensor different from the range sensor, such as one of an ultrasonic sensor, a radar, or a lidar.

A tenth aspect of the present disclosure provides the information processing apparatus according to the ninth aspect of the present disclosure, in which the predetermined sensor is a camera, and object estimator 206 generates the object information based on the received-wave information and a shape of the object obtained by processing an image captured by the camera.

According to this, the shape of the object can be estimated more accurately.

An eleventh aspect of the present disclosure provides the information processing apparatus according to the tenth aspect of the present disclosure, in which object estimator 206 generates the object information based on the received-wave information and a position of the object calculated by performing triangulation using the image captured by the camera.

According to this, the third position of the object can be estimated more accurately.

A twelfth aspect of the present disclosure provides the information processing apparatus according to any one of the fifth to eleventh aspects of the present disclosure, further including object confirmer 408 that determines whether the first position indicated by the first information generated using a first detection result of range sensor 101 obtained at a first point in time matches the second position calculated through the simulation according to the second calculation method using the third position generated using a second detection result of range sensor 101 obtained at a second point in time that is before the first point in time.

When the object is not moving, or when the object is moving very slowly, for example, the position of the object can be assumed to have no significant change. Therefore, the occurrence of false detection of the object can be further reduced by determining whether the currently-calculated position of the object is correct using the position of the object calculated in the past, for example.

A thirteenth aspect of the present disclosure provides the information processing apparatus according to any one of the first to twelfth aspects of the present disclosure, in which range sensor 101 is an ultrasonic sensor, a radar, or a lidar.

The positions of the objects calculated based on the detection result of such range sensor 101 may include incorrect coordinates that are theoretically calculated as described above. Therefore, the information processing apparatus is particularly effective in filtering the positions of the objects calculated when range sensor 101 is one of the above-described sensors.

A fourteenth aspect of the present disclosure provides an information processing method to be executed by a computer. The information processing method includes: obtaining (S10) first information indicating a first position of an object, which has been calculated based on a detection result of range sensor 101 according to a first calculation method, and second information indicating a second position of the object, which has been calculated through simulation according to a second calculation method different from the first calculation method; and determining (S20) whether the first position is correct by comparing the first information with the second information.

According to this, the same effects as those of the information processing apparatus according to an aspect of the present disclosure can be obtained.

A fifteenth aspect of the present disclosure provides a program for causing a computer to execute the information processing method according to the fourteenth aspect of the present disclosure.

According to this, the same effects as those of the information processing apparatus according to the aspect of the present disclosure can be obtained.

Other Embodiments

Although the present disclosure has been described with reference to the embodiments described above, the present disclosure is not limited to those embodiments. Hence, the elements shown in the accompanying drawings and described in the detailed description may include not only elements that are essential for solving the problems, but also elements that are not essential for solving the problems in order to illustrate the technologies described above. Thus, such inessential elements should not be readily construed as being essential based on the fact that such inessential elements are shown in the accompanying drawings or described in the detailed description.

For example, the information processing apparatus may be implemented by coordinate comparator 105. Alternatively, the information processing apparatus may be implemented by coordinate calculator 102 and coordinate comparator 105, for example. Alternatively, the information processing apparatus may be implemented by simulator 103 and coordinate comparator 105, for example. Alternatively, the information processing apparatus may be implemented by coordinate calculator 102, simulator 103, and coordinate comparator 105, for example.

For example, each of the elements (the processing elements) in each of the above-described embodiments may be implemented by executing a software program suitable for the element. Each of the elements may be implemented by a program executing unit, such as a central processing unit (CPU) or a processor, reading and executing the software program recorded on a recording medium such as a hard disk or a semiconductor memory.

Each of the elements may be configured in the form of an exclusive hardware product. Each of the elements may be a circuit (or an integrated circuit). These circuits may constitute a single circuit as a whole or may be separate circuits. These circuits may each be a general-purpose circuit or a dedicated circuit.

These general or specific aspects of the present disclosure may be implemented using a system, an apparatus, a method, an integrated circuit, a computer program, or a non-transitory computer-readable recording medium such as a CD-ROM, or any combination of systems, apparatuses, methods, integrated circuits, computer programs, and recording media.

The division of the functional blocks in each of the block diagrams is presented by way of an example. A plurality of functional blocks may be implemented as a single functional block, a single functional block may be divided into a plurality of functional blocks, or some functions may be transferred to other functional blocks. The functions of a plurality of functional blocks with similar functions may be processed by a single piece of hardware or software in parallel or time-division.

The order in which the steps in each of the flowcharts are executed is presented by way of an example for the purpose of specifically explaining the present disclosure, and therefore those steps may be executed in any order other than the order described above. Some of the above-described steps may be executed simultaneously (in parallel) with other steps.

Forms obtained by making various modifications to the above-described embodiments that can be conceived by those skilled in the art, as well as forms obtained by combining structural components and functions in different embodiments, without materially departing from the spirit of the present disclosure, may be included in the scope of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2023-043157 filed on Mar. 17, 2023.

INDUSTRIAL APPLICABILITY

The present disclosure is applicable to a control apparatus that controls a vehicle based on a detection result of an obstacle.

The invention claimed is:

1. An information processing apparatus comprising:

an obtaining circuit that obtains first information indicating a first position of an object and second information indicating a second position of the object, the first position having been calculated via triangulation using first received-wave information obtained from a range sensor according to a first calculation method, the second position having been calculated through simulation according to a second calculation method different from the first calculation method, wherein the first received-wave information includes at least a transmission time, a reception time and a received-wave power, and wherein the second calculation method calculates a reflection point, on the object, of a wave outputted from the range sensor based on a speed of the vehicle and a position of the vehicle;

a comparison circuit that determines whether the first position is correct by comparing the first information with the second information, thereby determining whether the object is located at the first position, and filtering out or deleting the first information when it is determined that the object is not located at the first position; and a simulation circuit that generates the second information by calculating the second position through the simulation according to the second calculation method, using object information indicating a third position of the object and a shape of the object as well as vehicle information regarding the vehicle in/to which the range sensor is provided, wherein the third position is generated based on a detection by the range sensor.

2. The information processing apparatus according to claim 1, further comprising:

a coordinate calculation circuit that generates the first information by calculating the first position via the triangulation according to the first calculation method.

3. The information processing apparatus according to claim 1, wherein the comparison circuit determines whether the first position is correct by determining whether the first position and the second position are located within a predetermined distance.

4. The information processing apparatus according to claim 3, wherein the range sensor emits a radio wave or a sound wave and detects a reflected wave which is the radio wave or the sound wave reflected from/by the object, and the information processing apparatus further comprises an object estimation circuit that generates the object information by estimating the third position based on second received-wave information indicating strength of the reflected wave detected by the range sensor, the second received-wave information being included in the detection result.

5. The information processing apparatus according to claim 4, wherein when a total number of the third positions estimated is three or more, the object estimation circuit determines a plurality of combinations of the three or more third positions, each of the plurality of combinations including two or more third positions from among the three or more third positions, and for each of the plurality of combinations, the object estimation circuit estimates the shape of the object under an assumption that the object is present at each of the two or more third positions in the combination.

6. The information processing apparatus according to claim 4, wherein when a total number of the third positions estimated is three or more, the object estimation circuit determines a plurality of combinations of the three or more third positions, each of the plurality of combinations including two or more third positions from among the three or more third positions, and the object estimation circuit selects, from among the plurality of combinations, a combination including the third position that is located farthest from a virtual axis extending in a front-back direction of the vehicle and passing through a center of the vehicle, and estimates the shape of the object under an assumption that the object is present at each of the two or more third positions in the combination.

7. The information processing apparatus according to claim 4, wherein when a total number of the third positions estimated is three or more, the object estimation circuit determines a plurality of combinations of the three or more third positions, each of the plurality of combinations including two or more third positions from among the three or more third positions, the object estimation circuit determines whether the three or more third positions are located on a traveling path of the vehicle when the vehicle moves forward or backward, and the object estimation circuit assumes that in a combination among the plurality of combinations, in which none of the two or more third positions are located on the traveling path of the vehicle, the object is present at each of the two or more third positions, and estimates the shape of the object to be a shape having a reflectivity higher than a predetermined reflectivity.

8. The information processing apparatus according to claim 4, wherein the object estimation circuit generates the object information based on the second received-wave information and sensor information obtained from a predetermined sensor of a type different from the range sensor.

9. The information processing apparatus according to claim 8, wherein the predetermined sensor is a camera, and the object estimation circuit generates the object information based on the second received-wave information and a shape of the object obtained by processing an image captured by the camera.

10. The information processing apparatus according to claim 9, wherein the object estimation circuit generates the object information based on the second received-wave information and a position of the object calculated by performing triangulation using the image captured by the camera.

11. The information processing apparatus according to claim 4, further comprising:

an object confirmation circuit that determines whether the first position indicated by the first information obtained at a first point in time matches the second position calculated through the simulation according to the second calculation method at a second point in time that is before the first point in time.

12. The information processing apparatus according to claim 1, wherein the range sensor is any one of an ultrasonic sensor, a radar, or a lidar.

13. An information processing method to be executed by a computer, the information processing method comprising:

obtaining first information indicating a first position of an object and second information indicating a second position of the object, the first position having been calculated via triangulation using received-wave information obtained from a range sensor according to a first calculation method, the second position having been calculated through simulation according to a second calculation method different from the first calculation method, wherein the received-wave information includes at least a transmission time, a reception time and a received-wave power, and wherein the second calculation method calculates a reflection point, on the object, of a wave outputted from the range sensor based on a speed of the vehicle and a position of the vehicle;

determining whether the first position is correct by comparing the first information with the second information, thereby determining whether the object is located at the first position, and filtering out or deleting the first information when it is determined that the object is not located at the first position; and generating the second information by calculating the second position through the simulation according to the second calculation method, using object information indicating a third position of the object and a shape of the object as well as vehicle information regarding the vehicle in/to which the range sensor is provided, wherein the third position is generated based on a detection by the range sensor.

14. A non-transitory computer-readable recording medium having recorded thereon a program for causing a computer to execute the information processing method according to claim 13.

* * * * *